(12) United States Patent
Sekuru et al.

(10) Patent No.: US 9,385,772 B1
(45) Date of Patent: Jul. 5, 2016

(54) ENHANCED STORAGE OPTION IN MULTI-SLOT COMMUNICATIONS SUPPORTING USB UICC SIM CARDS

(71) Applicant: QUALCOMM Incorporated, San Diego, CA (US)

(72) Inventors: Karthik Sekuru, Telangana (IN); Shruti Agrawal, Telangana (IN); Shivank Nayak, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/593,561

(22) Filed: Jan. 9, 2015

(51) Int. Cl.
*H04W 4/00* (2009.01)
*H04B 1/3816* (2015.01)
*H04W 84/04* (2009.01)
*H04W 88/06* (2009.01)

(52) U.S. Cl.
CPC ............ *H04B 1/3816* (2013.01); *H04W 4/008* (2013.01); *H04W 84/042* (2013.01); *H04W 88/06* (2013.01)

(58) Field of Classification Search
None
See application file for complete search history.

(56) References Cited

U.S. PATENT DOCUMENTS

| | | | |
|---|---|---|---|
| 8,126,506 B2 | 2/2012 | Roundtree | |
| 2007/0156959 A1 | 7/2007 | Uno | |
| 2009/0019223 A1 | 1/2009 | Lection et al. | |
| 2010/0268864 A1 | 10/2010 | Ramiya et al. | |
| 2011/0149114 A1 | 6/2011 | Tsujii | |
| 2012/0023297 A1 | 1/2012 | Duzly et al. | |
| 2013/0016635 A1* | 1/2013 | Linsky | H04W 72/1215 370/280 |

FOREIGN PATENT DOCUMENTS

| | | |
|---|---|---|
| CN | 2495069 Y | 6/2002 |
| EP | 2224326 A1 | 9/2010 |
| JP | 2010219840 A | 9/2010 |
| WO | 2013038236 A1 | 3/2013 |

OTHER PUBLICATIONS

IRAP: "Advanced Solid-State Memory Systems and Products: Emerging Non-Volatile Memory Technologies, Industry Trends and Market Analysis," Apr. 2011, pp. 5.
International Search Report and Written Opinion—PCT/US2015/068067—ISA/EPO—Apr. 4, 2016.

* cited by examiner

*Primary Examiner* — Diane Mizrahi
(74) *Attorney, Agent, or Firm* — The Marbury Law Group, PLLC

(57) ABSTRACT

The various embodiments include methods and apparatuses for providing multiple memories on a multi-slot communication device or on a multi-slot communication device and a wireless device as a single, contiguous, combined memory. The memories may include various types of universal serial bus (USB) and/or universal integrated circuit card (UICC) memories. Ranges of physical addresses of portions of each memory may be associated with a range of virtual addresses of the combined memory. The associations of physical and virtual addresses may be stored on the multi-slot communication device. A single memory access request to the combined memory may be made using the virtual addresses, then translated into multiple memory access requests for the individual memories using the physical addresses. Providing memory access requests to a memory on the wireless device may be accomplished by connecting to the memory on the wireless device over a wireless network by the multi-slot communication device.

30 Claims, 13 Drawing Sheets

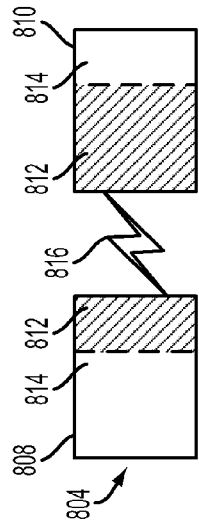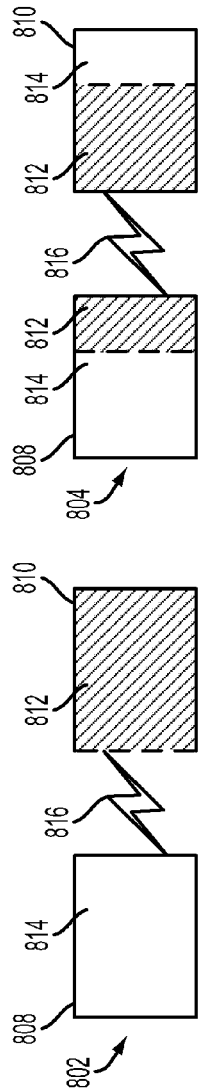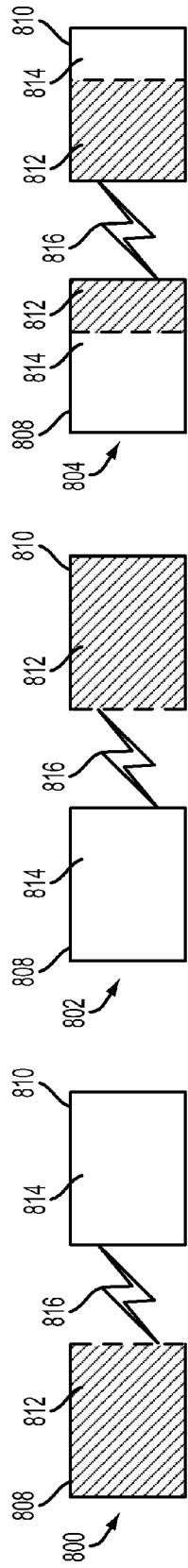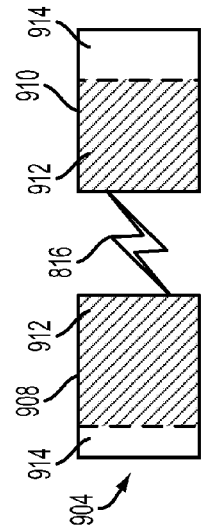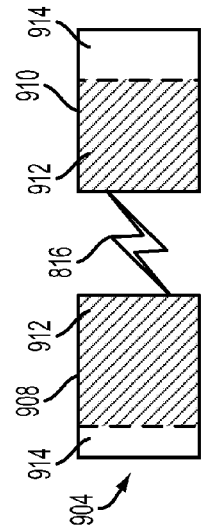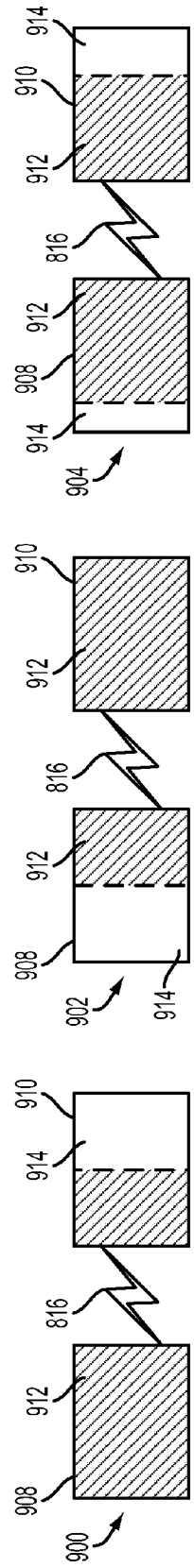

ENHANCED STORAGE OPTION IN MULTI-SLOT COMMUNICATIONS SUPPORTING USB UICC SIM CARDS

RELATED APPLICATIONS

This application is related to U.S. patent application Ser. No. 14/593,526 entitled Enhanced Storage Option In Multi-slot Communications Supporting USB UICC SIM Cards, which is filed concurrently herewith.

BACKGROUND

Various wireless communication networks require that user equipment/mobile devices, such as smartphones, employ universal integrated circuit cards (UICCs) supporting user identity module (UIM) functions to communicate over the wireless communication networks. UIM functions may include subscriber identity module (SIM) functions for connecting to Global System for Mobile Communications (GSM) based wireless communication networks, universal SIM (USIM) functions for connecting to Universal Mobile Telecommunications System (UMTS) based wireless communication networks, and/or CDMA SIM (CSIM) functions for connecting to code division multiple access (CDMA) based wireless communication networks. Mobile devices have been developed to accommodate the use of multiple UICCs so that the mobile device may communicate over different wireless communication networks and/or so mobile device users may have multiple wireless communication network accounts, for various reasons, such as separating personal and professional accounts. UICCs have been developed to communicate with mobile devices via universal serial bus (USB) interfaces and to incorporate onboard memory storage. Mobile devices configured to use multiple UICCs may include multiple slots, each slot configured to accommodate one UICC at time.

On multi-slot communication devices, memory storage for different USB UICC UIM cards are currently mounted onto different mount points and users can use the USB UICC UIM cards as separate memory storage units. A file size of a file to be stored on the memory storage of the USB UICC UIM cards is currently limited to the storage space of a single USB UICC UIM card. Files bigger than the available storage space of a single USB UICC UIM card cannot be stored on the USB UICC UIM cards, even when the total storage capacity available from all the available USB UICC UIM cards is greater than the file size.

SUMMARY

The methods and apparatuses of various embodiments provide circuits and methods for managing multiple memory devices as a single contiguous memory that may include determining a portion of a memory on a multi-slot communication device is associated with a portion of a removable memory as the single contiguous memory, attempting to access the single contiguous memory on the multi-slot communication device, determining that the removable memory is inaccessible on the multi-slot communication device, identifying a unique identifier of the removable memory, connecting to the removable memory connected to a wireless device via a wireless network by the multi-slot communication device, and accessing the memory and the removable memory as the single contiguous memory by the multi-slot communication device using the wireless network to access the removable memory by the multi-slot communication device.

Some embodiment methods may include translating a memory access request for a virtual memory address to at least one memory access request for a physical address of at least one of the memory on the multi-slot communication device and the removable memory on the wireless device.

In some embodiments, translating a memory access request for a virtual memory address to at least one memory access request for a physical address of at least one of the memory on the multi-slot communication device and the removable memory on the wireless device may include translating the memory access request for the virtual memory address to a plurality of memory access requests for physical addresses of both the memory and the removable memory.

Some embodiment methods may include dividing a file or group of files of the memory access request for the virtual memory address among the plurality of memory access requests for the physical addresses of both the memory and the removable memory.

In some embodiments, accessing the memory and the removable memory as the single contiguous memory by the multi-slot communication device using the wireless network to access the removable memory by the multi-slot communication device may include sending the memory access request for the physical address of the removable memory to the removable memory over the wireless network by the multi-slot communication device.

In some embodiments, translating a memory access request for a virtual memory address to at least one memory access request for a physical address of at least one of the memory on the multi-slot communication device and the removable memory on the wireless device is accomplished in a middle layer, and may include operating an application in an application layer using the virtual memory address as if the memory and the removable memory were a single contiguous memory within the multi-slot communication device.

In some embodiments, determining a portion of a memory on a multi-slot communication device is associated with a portion of a removable memory as the single contiguous memory may include retrieving an entry of memory correlation data correlating a unique identifier of the memory and the unique identifier of the removable memory on the multi-slot communication device.

In some embodiments, the removable memory is a removable universal integrated circuit card (UICC) memory, the wireless network is cellular network, and connecting to the removable memory connected to a wireless device via a wireless network may include connecting to the removable UICC memory connected to the wireless device via the cellular network using the unique identifier of the removable UICC memory by the multi-slot communication device.

In some embodiments, the UICC memory is a universal serial bus (USB) UICC memory. In some embodiments, the memory is a universal serial bus (USB) memory.

In some embodiments, connecting to the removable memory connected to a wireless device via a wireless network by the multi-slot communication device may include engaging in a handshake exchange of information, and enabling a data connection to the removable memory.

In some embodiments, engaging in a handshake exchange of information may include engaging in a handshake exchange of information via a first wireless network, and enabling a data connection to the removable memory may include enabling a data connection to the removable memory via a second wireless network.

In some embodiments, the first wireless network may include a cellular network, and enabling a data connection to the removable memory via a second wireless network may include using one of a wireless local area network (WLAN) protocol, a Bluetooth data link, and a WiFi Direct data link.

Some embodiment methods may include receiving, from the wireless device, details of the portion of the removable memory offloaded by the wireless device to means for identifying another memory, updating a memory correlation table to reflect the details of the portion of the removable memory offloaded by the wireless device to the other memory, and in some embodiments accessing the memory and the removable memory as the single contiguous memory by the multi-slot communication device using the wireless network to access the removable memory by the multi-slot communication device may include accessing the memory and the other memory containing the portion of the removable memory offloaded by the wireless device to the other memory as the single contiguous memory by the multi-slot communication device.

Embodiments include a multi-slot communication device having a first memory device interface slot configure to connect to a memory, a second memory device interface slot configure to connect to a remote memory, and a processor configured to execute a memory manager component and configured with processor-executable instructions to perform operations of one or more of the embodiment methods described above.

Embodiments include a multi-slot communication device having means for performing functions of one or more of the embodiment methods described above.

Embodiments include a non-transitory processor-readable medium having stored thereon processor-executable software instructions to cause a processor to perform operations of one or more of the embodiment methods described above.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

FIGS. 8A-8C are illustrations of combined USB UICC memory on separate multi-slot communication devices in accordance with various embodiments.

FIGS. 9A-9C are illustrations of combined USB UICC memory on separate multi-slot communication devices in accordance with various embodiments.

DETAILED DESCRIPTION

Figure 1:
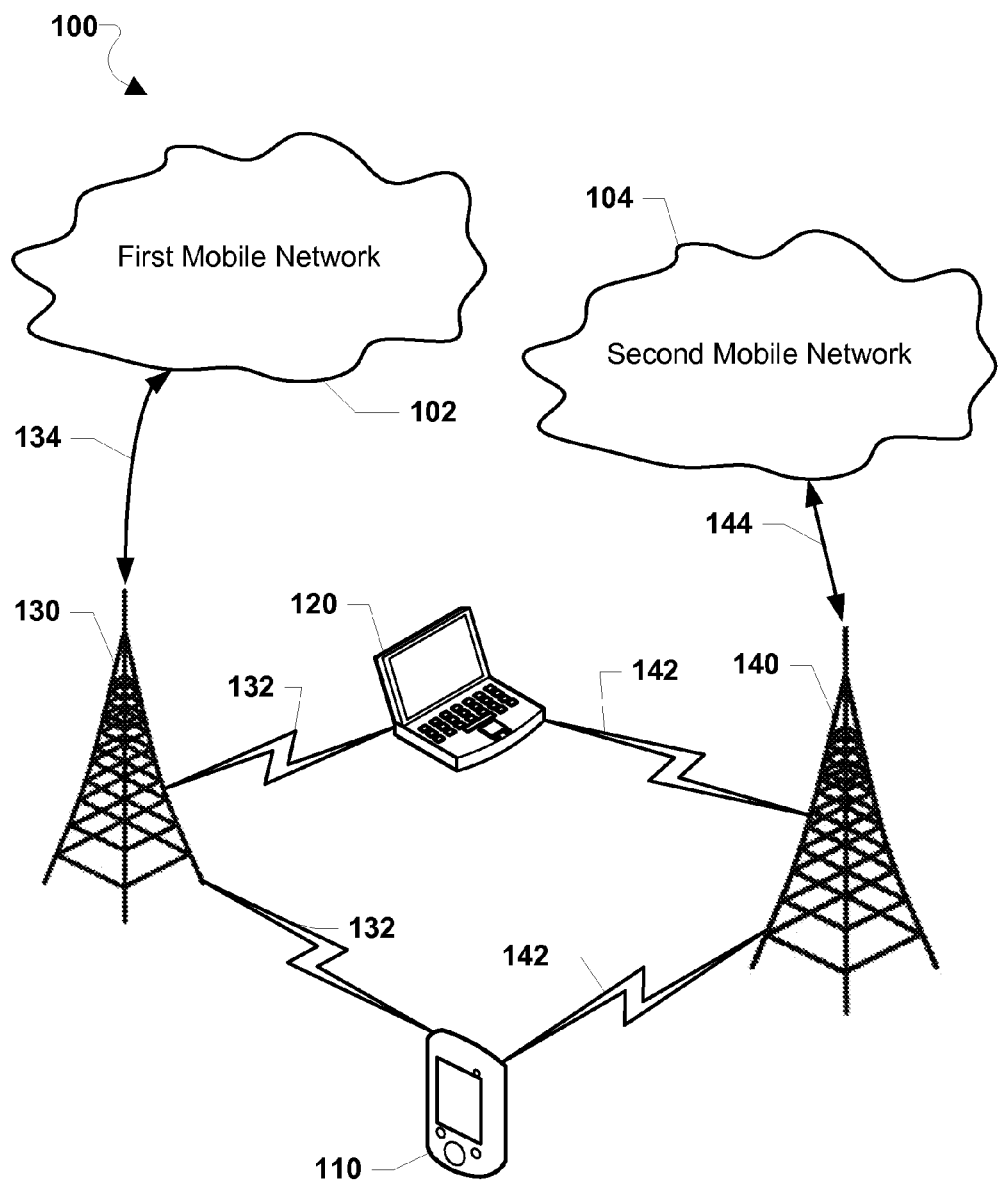
FIG. 1 is a communication system block diagram illustrating a network suitable for use with various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

The terms "computing device," "mobile device," and "wireless communication device" are used interchangeably herein to refer to any one or all of cellular telephones, smart-phones, personal or mobile multi-media players, personal data assistants (PDAs), laptop computers, tablet computers, smartbooks, ultrabooks, palm-top computers, wireless electronic mail receivers, multimedia Internet enabled cellular telephones, wireless gaming controllers, and similar personal electronic devices which include a memory, a programmable processor and wireless communication circuitry. As used herein, the term "multi-slot communication device" refers to a wireless communication device that includes at least two interface slots for connecting to UICCs. In some embodiments a multi-slot communication device may be a multi-SIM communication device capable of communicating with two or more mobile communication networks.

Descriptions of the various embodiments refer to multi-slot communication devices, which may include mobile devices capable of concurrently interfacing with multiple universal integrated circuit cards (UICCs). The multi-slot communication devices may embody any multiple-technology (multi-technology) wireless communication device that may individually maintain a plurality of connections to a plurality of mobile networks through one or more radio communication circuits and one or more types of user identity module (UIM) associated with the UICCs. For example, the various embodiments may be implemented in multi-SIM multi-active devices of any combination of number of subscriber identity modules (SIM) and concurrently active subscriptions. Multi-technology devices enable a user to connect to different mobile networks (or different accounts on the same network) while using the same multi-technology communication device. For example, a multi-technology communication device may connect to GSM, TDSCDMA, CDMA2000, WCDMA and other radio frequency networks. In the various embodiments, multi-technology communication devices may also include multiple RF chains so that each network communication supported by each RF chain can be accomplished concurrently if interference problems are managed. While the various embodiments are particularly useful for mobile devices, such as smartphones, the embodiments are generally useful in any electronic device that implements radio hardware and UICCs to communicate over a wireless network.

Descriptions of the various embodiments refer to combining multiple universal serial bus (USB) UICC memories. The descriptions referring to multiple USB UICC memories are examples used for simplicity, and it should be understood that a combined USB UICC memory may include other UICC memories and memory devices of different formats, such as a USB memory stick, a CompactFlash memory card, a Secure Digital memory card, a SmartMedia memory card, a solid-state drive, and the like.

Methods and apparatuses of various embodiments described herein provide the capability to treat two or more USB UICCs of a multi-slot communication device as a single memory unit, enabling saving files larger than the available storage space of a single USB UICC. A memory manager may be implemented capable of providing a combination of the memory storage of multiple USB UICCs as a single, contiguous memory storage device. The memory manager may manage the assignment of memory addresses across the memory storage of the multiple USB UICCs for storage and retrieval of a single or group of files. The memory manager may communicate with the multiple USB UICCs using USB protocols. The various embodiments enable a single or group of files to be stored to and retrieved from the memory storage of the multiple USB UICCs, where previously a single or group of files would have to be stored to and retrieved from the memory storage of a single USB UICC.

In some embodiments, a multi-slot communication device may implement a multi-layered system, including a graphical user interface (GUI) layer, a middle layer, and a memory layer. At the GUI layer, the multi-slot communication device may provide the memory storage of multiple USB UICCs as a single/combined, contiguous memory space. For example, the multi-slot communication device may include two USB UICCs, each having 1 GB of memory storage capacity. In some embodiments a multi-slot communication device may be a multi-SIM communication device. At the GUI layer, the multi-slot communication device may provide the memory storage of multiple USB UICCs as a single memory storage with 2 GB of memory storage capacity. Commands to store files to and retrieve files from the single contiguous combined memory space may be issued from the GUI layer. A user may select to combine the memory storages via the GUI layer.

The middle layer may include a memory manager configured to manage the storage to and retrieval from the memory storage capacities of the USB UICCs as the single contiguous combined memory space. The memory manager may be configured to translate memory addresses of the commands for accessing the combined memory space from an application layer to memory addresses for accessing the memory storage of multiple USB UICCs. For example, the memory manager may receive a command to store or retrieve a file from the combined memory space of two USB UICCs that does not fit on the available memory storage of only one of the USB UICCs. The command may include a single memory address for accessing a file in the combined memory space. The memory manager may translate the single memory address of the combined memory space to multiple memory addresses for accessing the same file in the memory storage of each USB UICC. In response to a command to store the file, the memory manager may divide the file into parts and assign each part an address on a respective one of the memory storages of each USB UICCs.

In response to a command to retrieve the file, the memory manager may determine memory addresses for respective parts of the file stored on different memory storages of the USB UICCs to retrieve the parts of the file and to provide the parts of the retrieved file to the application layer in the correct order. The memory manager may also issue commands, in accordance with the command received from the GUI, to the USB UICCs to access the respective memory storages at the address for each memory storage. The memory manager may communicate these commands using USB protocols compatible with the USB UICCs.

At the memory layer, the USB UICCs may receive the commands including the address for accessing their respective memory storages via the USB protocol. The USB UICCs may implement the command to either read to or write from their respective memory storages at the specified address, and return any data and/or signals to the memory manager via the USB protocol.

In some embodiments, the multi-slot communication device may include capabilities for handling circumstances where at least one of the USB UICCs containing part of a file is removed from the multi-slot communication device. When a USB UICC is replaced, the memory manager may use identifiers for each USB UICC to properly translate the addresses and identify the content stored on each USB UICC. In some embodiments, a removed USB UICC inserted into another mobile device may be made accessible to the multi-slot communication device via a wireless connection.

The various embodiments may be implemented in multi-slot wireless communication devices that operate within a variety of communication systems 100, such as at least two mobile telephony networks, an example of which is illustrated in FIG. 1. A first mobile network 102 and a second mobile network 104 are typical mobile networks that include a plurality of cellular base stations 130 and 140. A first multi-slot communication device 110 may be in communication with the first mobile network 102 through a cellular connection 132 to a first base station 130. As described, in some embodiments the multi-slot communication device 110 may be a multi-SIM communication device. The first multi-slot communication device 110 may also be in communication with the second mobile network 104 through a cellular connection 142 to a second base station 140. The first base station 130 may be in communication with the first mobile network 102 over a connection 134. The second base station 140 may be in communication with the second mobile network 104 over a connection 144.

A second multi-slot communication device 120 may similarly communicate with the first mobile network 102 through a cellular connection 132 to a first base station 130. The second multi-slot communication device 120 may communicate with the second mobile network 104 through a cellular connection 142 to the second base station 140. The cellular connections 132 and 142 may be made through two-way wireless communication links, such as 4G, 3G, CDMA, TDSCDMA, WCDMA, GSM, and other mobile telephony communication technologies. Other connections may include various other wireless connections, including WLANs, such as Wi-Fi based on IEEE 802.11 standards, and wireless location services, such as GPS.

Figure 2:
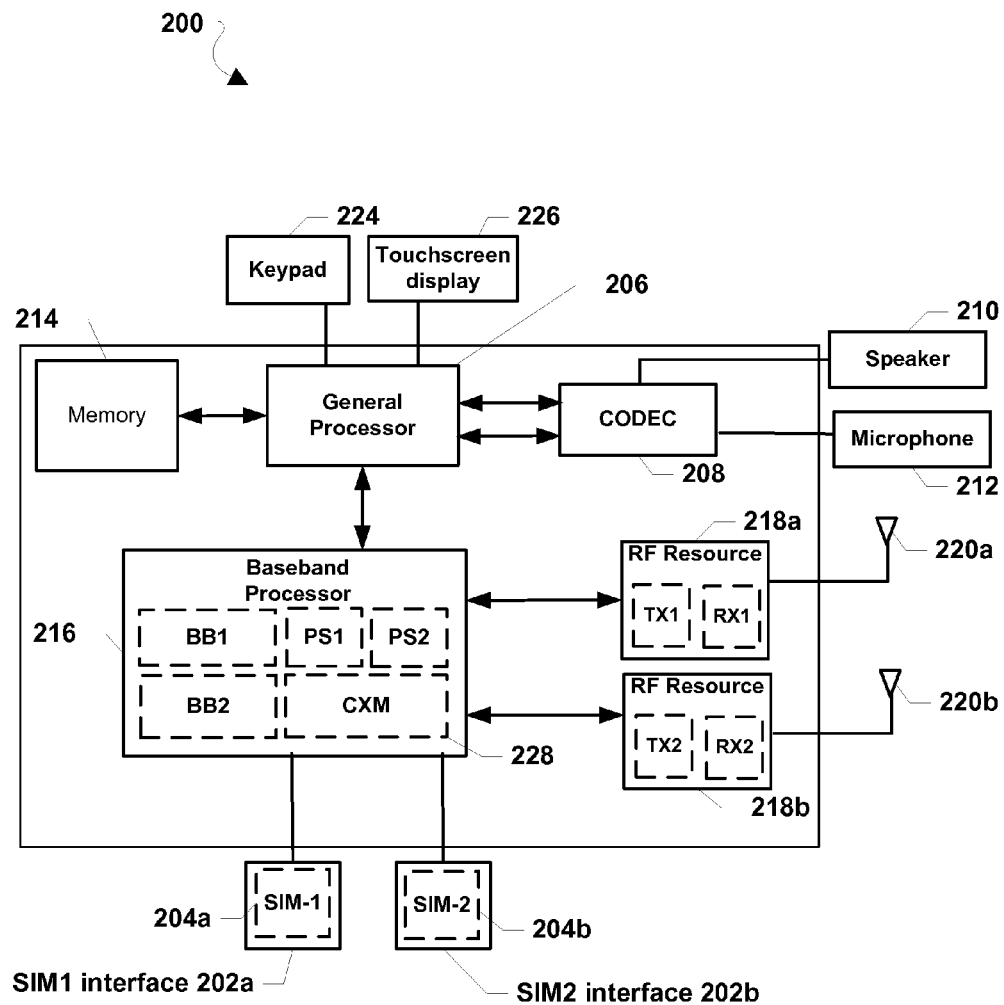
FIG. 2 is a component block diagram illustrating various embodiments of a multi-slot communication device.

FIG. 2 illustrates various embodiments of a multi-slot communication device 200 that is illustrated as a dual-technology communication device (e.g., 110, 120 in FIG. 1) that is suitable for implementing the various embodiments. With reference to FIGS. 1 and 2, the multi-slot communication device 200 may include a first SIM interface 202a, which may receive a first identity module SIM-1 204a that is associated with the first subscription. The multi-slot communication device 200 may also be a multi-SIM communication device by including a second (or more) SIM interface 202b, which may receive a second identity module SIM-2 204b that is associated with a second subscription.

A SIM in the various embodiments may be a Universal Integrated Circuit Card (UICC) that is configured with SIM and/or USIM applications, enabling access to, for example, GSM and/or UMTS networks. The UICC may also provide storage for a phone book and other applications. Alternatively, in a CDMA network, a SIM may be a UICC removable user identity module (R-UIM) or a CDMA subscriber identity module (CSIM) on a card.

Each SIM may have a CPU, ROM, RAM, EEPROM and I/O circuits. A SIM used in the various embodiments may contain user account information, an international mobile subscriber identity (IMSI), a set of SIM method application toolkit (SAT) commands and storage space for phone book contacts. A SIM may further store a Home Public-Land-Mobile-Network (HPLMN) code to indicate the SIM card network operator provider. An Integrated Circuit Card Identity (ICCID) SIM serial number may be printed on the SIM for identification.

Each multi-slot communication device 200 may include at least one controller, such as a general purpose processor 206, which may be coupled to a coder/decoder (CODEC) 208. The CODEC 208 may in turn be coupled to a speaker 210 and a microphone 212. The general purpose processor 206 may also be coupled to at least one memory 214. The memory 214 may be a non-transitory tangible computer readable storage medium that stores processor-executable instructions. For example, the instructions may include routing communication data relating to the first or second subscription though a corresponding baseband-RF resource chain.

The memory 214 may store operating system (OS) software, as well as user application software and executable instructions. The memory 214 may also store application data, such as an array data structure.

The general purpose processor 206 and memory 214 may each be coupled to at least one baseband modem processor 216. Each SIM in the multi-slot communication device 200 (e.g., SIM-1 202a and SIM-2 202b) may be associated with a baseband-RF resource chain. Each baseband-RF resource chain may include the baseband modem processor 216 to perform baseband/modem functions for communications on a SIM, and one or more amplifiers and radios, referred to generally herein as RF resources 218a, 128b. In some embodiments, baseband-RF resource chains may interact with a shared baseband modem processor 216 (i.e., a single device that performs baseband/modem functions for all SIMs on the wireless device). Alternatively, each baseband-RF resource chain may include physically or logically separate baseband processors (e.g., BB1, BB2).

In some embodiments, the baseband modem processor 216 may be an integrated chip capable of managing the protocol stacks of each of the SIMs or subscriptions (e.g., PS1, PS1) and implementing a co-existence manager software (not shown) (e.g., CXM). By implementing modem software, subscription protocol stacks, and the co-existence manager software on this integrated baseband modem processor 216, thread based instructions may be used on the integrated baseband modem processor 216 to communicate instructions between the software implementing the interference prediction, the mitigation techniques for co-existence issues, and the Rx and Tx operations.

The RF resources 218a, 218b may be communication circuits or transceivers that perform transmit/receive functions for the associated SIM of the wireless device. The RF resources 218a, 218b may be communication circuits that include separate transmit and receive circuitry, or may include a transceiver that combines transmitter and receiver functions. The RF resources 218a, 218b may be coupled to a wireless antenna (e.g., a first wireless antenna 220a and a second wireless antenna 220b). The RF resources 218a, 218b may also be coupled to the baseband modem processor 216.

In some embodiments, the general purpose processor 206, memory 214, baseband processor(s) 216, and RF resources 218a, 218b may be included in the multi-slot communication device 200 as a system-on-chip. In other embodiments, the first and second SIMs 202a, 202b and their corresponding interfaces 204a, 204b may be external to the system-on-chip. Further, various input and output devices may be coupled to components on the system-on-chip, such as interfaces or controllers. Example user input components suitable for use in the multi-slot communication device 200 may include, but are not limited to, a keypad 224 and a touchscreen display 226.

In some embodiments, the keypad 224, touchscreen display 226, microphone 212, or a combination thereof, may perform the function of receiving the request to initiate an outgoing call. For example, the touchscreen display 226 may receive a selection of a contact from a contact list or receive a telephone number. In another example, either or both of the touchscreen display 226 and microphone 212 may perform the function of receiving a request to initiate an outgoing call. For example, the touchscreen display 226 may receive selection of a contact from a contact list or to receive a telephone number. As another example, the request to initiate the outgoing call may be in the form of a voice command received via the microphone 212. Interfaces may be provided between the various software modules and functions in multi-slot communication device 200 to enable communication between them, as is known in the art.

In some embodiments, the multi-slot communication device 200 may instead be a single-technology or multiple-technology device having more or less than two RF chains. Further, various embodiments may implement, single RF chain or multiple RF chain wireless communication devices with fewer SIM cards than the number of RF chains, including without using any SIM card.

Figure 3:
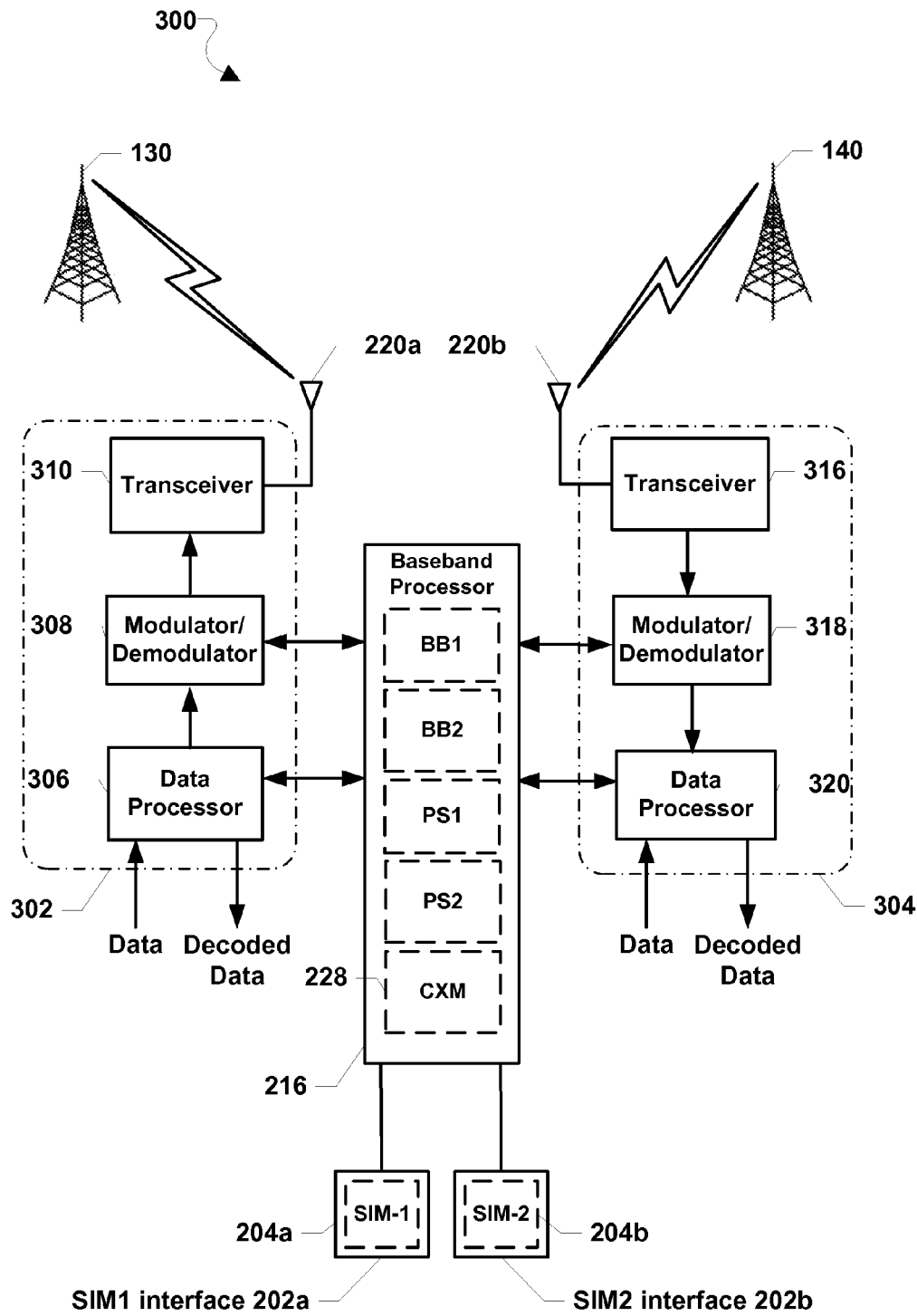
FIG. 3 is a component block diagram illustrating an interaction between components of different transmit/receive chains in various embodiments of a multi-slot communication device.

FIG. 3 illustrates embodiment interactions between components of different transmit/receive chains in a multi-slot wireless communications device within a wireless communication environment 300 including two base stations 130, 140. With reference to FIGS. 1-3, for example, a first radio technology RF chain 302 may be one RF resource 218a, and a second radio technology RF chain 304 may be part of another RF resource 218b. In some embodiments, the first and second radio technology RF chains 302, 304 may include components operable for transmitting data. When transmitting data, a data processor 306, 320 that may format, encode, and interleave data to be transmitted. A modulator/demodulator 308, 318 may modulate a carrier signal with encoded data, for example, by performing Gaussian minimum shift keying (GMSK). One or more transceiver circuits 310, 316 may condition the modulated signal (e.g., by filtering, amplifying, and up-converting) to generate a RF modulated signal for transmission. The RF modulated signal may be transmitted, for example, to the base station 130, 140 via an antenna, such as the antenna 220a, 220b.

The components of the first and second radio technology RF chains 302, 304 may also be operable to receive data. When receiving data, the antenna 220a, 220b may receive RF modulated signals from the base station 130, 140 for example. The one or more transceiver circuits 310, 316 may condition (e.g., filter, amplify, and down-convert) the received RF modulated signal, digitize the conditioned signal, and provide samples to the modulator/demodulator 308, 318. The modulator/demodulator 308, 318 may extract the original information-bearing signal from the modulated carrier wave, and may provide the demodulated signal to the data processor 306, 320. The data processor 306, 320 may de-interleave and decode the signal to obtain the original, decoded data, and may provide decoded data to other components in the wireless device.

Operations of the first and second radio technology RF chains 302, 304 may be controlled by a processor, such as the baseband processor(s) 216. In the various embodiments, each of the first and second radio technology RF chains 302, 304 may be implemented as circuitry that may be separated into respective receive and transmit circuits (not shown). Alternatively, the first and second radio technology RF chains 302, 304 may combine receive and transmit circuitry (e.g., as transceivers associated with SIM-1 and SIM-2 in FIG. 2).

Figure 4:
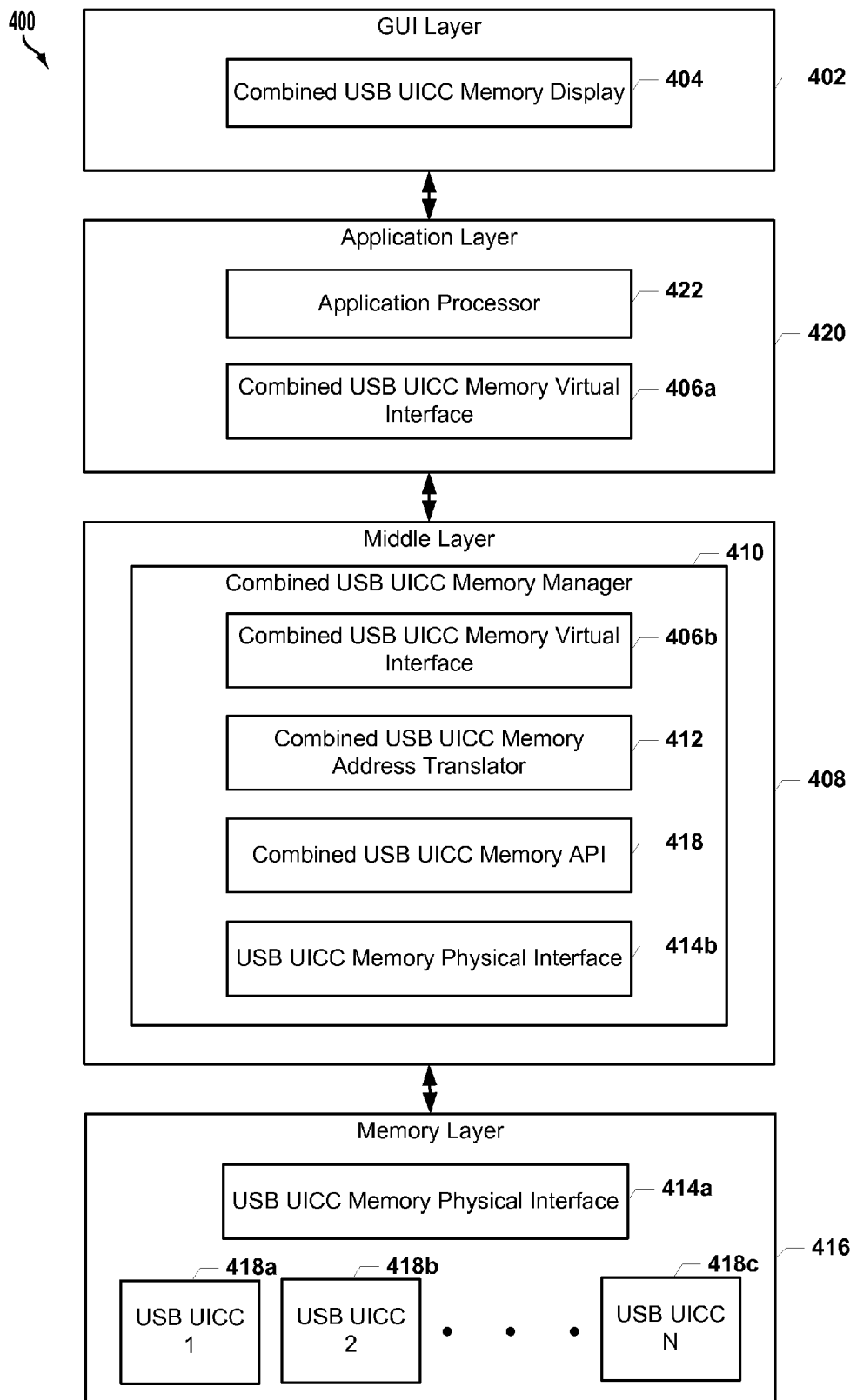
FIG. 4 is a component block diagram illustrating a system for combining USB UICC memories in accordance with various embodiments.

FIG. 4 illustrates a system 400 for combining USB UICC memories 418a-c on a multi-slot communication device (e.g., 110, 120, 200 in FIGS. 1 and 2) in accordance with various embodiments. With reference to FIGS. 1-4, the system 400 for combining the USB UICC memories 418a-c may include a graphical user interface (GUI) layer 402, an application layer 420, a middle layer 408, and a memory layer 416. In various embodiments, the GUI layer 402 may be configured to provide a user of the multi-slot communication device capabilities to see displays of data and to interact with data and system in multiple forms on the multi-slot communication device.

The GUI layer 402 may include a combined USB UICC memory display component 404, which may be part of or separate from a general display component (e.g., 1402, 1404, 1511 in FIGS. 14 and 15) for providing a GUI on a display (e.g., 226, 1412, 1519 in FIGS. 2, 14, and 15) of the multi-slot communication device. The combined USB UICC memory display component 404 may be configured to provide at least two of the USB UICC memories 418a-c as a combined, contiguous, single USB UICC memory (e.g., 600, 602, 604, 700, 702, 704, 800, 802, 804, 900, 902, 904 in FIGS. 6A-9C) via the GUI. Example displays of the combined USB UICC memory may include an icon, a memory directory path, a graphical or text based representation of the memory space (including free and used memory space) of the combined USB UICC memory. In various embodiments, the displays may indicate that the combined USB UICC is a combination of at least two of the USB UICC memories 418a-c, including an indication of the USB UICC memories 418a-c that are included in the combined USB UICC memory. In various embodiments, the displays may indicate the combined USB UICC memory without an indication that is a combination of at least two of the USB UICC memories 418a-c.

In various embodiments, the combined USB UICC memory may be a virtual representation of its underlying USB UICC memories 418a-c and/or the GUI layer 402 may be implemented by a hypervisor or virtual machine Memory access requests to the virtual representation of the combined USB UICC memory and/or originating from programs run by the virtual machine may be made to a virtual address of the of the combined USB UICC memory.

The GUI layer 402 may be in communication with the application layer 420. In various embodiments, the application layer 420 may include an application processor 422 (e.g., 206, 1402, 1511 in FIGS. 2, 14, and 15) and a combined USB UICC memory virtual interface component 406a. The application processor 422 may be configured to execute applications, issue memory access requests, and receive, and process inputs from other components of the multi-slot communication device. For example, the application processor 422 may receive inputs from the GUI layer 420 representing the user's interactions with the GUI, such as an interaction with a GUI element indicating a request to combine USB UICC memories. The combined USB UICC memory virtual interface component 406a may provide the memory access requests for the virtual addresses of the combined USB UICC memory to the middle layer 408 and receive responses to the memory access requests.

The memory layer 416 may be configured to provide access to the USB UICC memories 418a-c. Memory device interface slots (e.g., 202a and 202b in FIGS. 2 and 3) may physically and/or electrically connect the USB UICC memories 418a-c to the multi-slot communication device. The three USB UICC memories 418a-c of the system 400 are in no way limiting in number. There may be as many USB UICC memories 418a-c connected to the multi-slot communication device as there are memory device interface slots. In various embodiments, at least two memory device interface slots are provided in the multi-slot communication device. In various embodiments, at least one of the memory device interface slots may be configured to allow a USB UICC memory 418a-c to be exchangeable/removable, while the other memory device interface slot(s) may be similarly configured or configured with a fixed USB UICC memory 418a-c. In various embodiments, a memory device interface slot may be singularly configured to interface with one type of memory device. In various embodiments, a memory device interface slot may be multiply configured to interface with multiple types of memory devices. The memory layer 416 may facilitate the components of the multi-slot communication device, including the system 400 for combining USB UICC memories 418a-c to interact with the USB UICC memories 418a-c. The memory layer 416 may include a combined USB UICC memory physical interface component 414a, which may provide read and write access to the USB UICC memories 418a-c for executing the memory access requests for physical addresses of the USB UICC memories 418a-c.

The middle layer 408 may be configured to coordinate memory access requests for the virtual addresses of the combined USB UICC memory from the application layer 420 with the physical USB UICC memories 418a-c at the memory layer 416. In various embodiments, the middle layer 408 may include a combined USB UICC memory manager component 410 for managing routing the memory access requests and translating between the virtual addresses of the combined USB UICC and the physical addresses of the corresponding USB UICC memories 418a-c. The combined USB UICC memory manager 410 may include a combined USB UICC memory virtual interface component 406b, like the application layer 420. The combined USB UICC memory virtual interface 406b may facilitate receiving the memory access requests for the virtual addresses of the combined USB UICC memory from the application layer 420, and providing responses associated with the memory access requests for the virtual addresses of the combined USB UICC memory to the application layer 402. The combined USB UICC memory manager 410 may include a combined USB UICC memory physical interface component 414b, like the memory layer 416. The combined USB UICC memory physical interface 414b may facilitate implementing read and write access to the USB UICC memories 418a-c for executing the memory access requests for physical addresses of the USB UICC memories 418a-c by providing provide the memory access requests for physical addresses to the memory layer 416. The combined USB UICC memory physical interface 414b may also receive any return data of the memory access requests for physical addresses of the USB UICC memories 418a-c.

The combined USB UICC memory manager 410 may also include a combined USB UICC memory address translator component 412, which may translate between the virtual addresses of the combined USB UICC and the physical addresses of the corresponding USB UICC memories 418a-c. The combined USB UICC memory address translator 412 may store and/or have access to a data structure or algorithm configured to relate the virtual addresses of the combined USB UICC and the physical addresses of the corresponding USB UICC memories 418a-c. In various embodiments, the combined USB UICC memory address translator 412 may access a memory map or table that relates the virtual addresses and the physical addresses. Various embodiments enable a pair of a combined USB UICC memory and USB UICC memories 418a-c to be related in the memory map or table along with or in a separate memory map or table from other pairs of combined USB UICC memories and USB UICC memories 418a-c. The combined USB UICC memory address translator component 412 may receive a signal associated with a virtual memory address or a physical memory address, such as a memory access request from the application layer 420 or a response to memory access request from the memory layer 416, and provide the corollary physical address or virtual address, respectively. The combined USB UICC memory manager 410 may route and manage the flow of the memory layer 416 and responses to the application layer 420.

In various embodiments, the combined USB UICC memory manager 410 may be configured to interact with the USB UICC memories 418a-c via USB communications protocols. In various embodiments, the combined USB UICC memory manager 410 may use a combined USB UICC memory instruction application program interface (API) 420 to convert instructions of a memory access request to the combined USB UICC memory received in another communication protocol into USB communication protocols. The combined USB UICC memory manager 410 may use a combined USB UICC memory instruction API 420 to convert the memory access request responses by the USB UICC memories 418a-c from USB communication protocols to the other communication protocol of the memory access request. For example, in response to receiving a single memory access request to the combined USB UICC memory in a first communication protocol (other than a USB communication protocol), the combined USB UICC memory manager 410 may convert the memory access request to multiple memory access requests of the same type in a USB communication protocol for the underlying USB UICC memories 418a-c of the combined USB UICC memory. Similarly, the USB UICC memory manager 410 may combine multiple responses in a USB communication protocol to the memory access request into a single response of the first communication protocol.

In various embodiments, the USB UICC memory manager 410 may be configured to protect data stored at the physical addresses of the USB UICC memories that correspond to a combined USB UICC memory. In response to executing a write memory request to the physical addresses of the USB UICC memories that correspond to a combined USB UICC memory, the USB UICC memory manager 410 may signal the USB UICC memories to lock those physical addresses so that the data may not be rearranged in or deleted from the USB UICC memory. This lock on the physical addresses may protect the stored data while the USB UICC memories are used in their capacities as individual memories or as part of other combined USB UICC memories. The physical addresses may be unlocked by the memory manager while the USB UICC memories are combined as the combined USB UICC memory associated with the physical memory addresses.

Each of the layers 402, 408, 416, and the components 404, 406a, 406b, 410, 412, 414a, 414b may be separate or combined in any combination, and may be implemented in software, general processing hardware, dedicated hardware, or a combination of any of the preceding.

Figure 5:
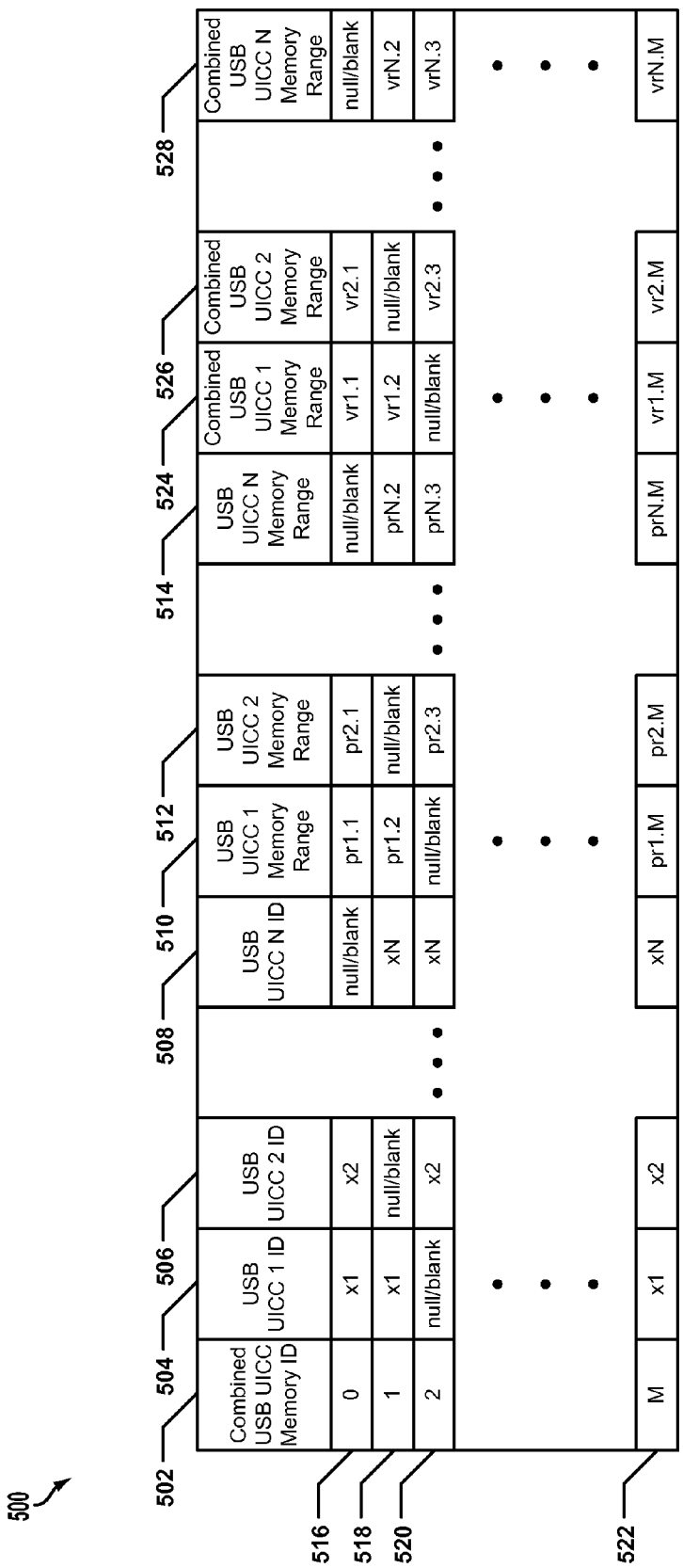
FIG. 5 is a component block diagram illustrating a USB UICC memory correlation table in accordance with various embodiments.

FIG. 5 illustrates a USB UICC memory correlation table 500 configured to correlate a combined USB UICC memory (e.g., 600, 602, 604, 700, 702, 704, 800, 802, 804, 900, 902, 904 in FIGS. 6A-9C) and provide at least two USB UICC memories (e.g., 418a-c in FIG. 4) in accordance with various embodiments. With reference to FIGS. 1-5, the USB UICC memory correlation table 500 may be stored on a memory (e.g., 214, 1406, 1512, 1513, 1602, 1604 in FIGS. 2, 14, 15, and 16) of the multi-slot communication device (e.g., 110, 120, 200 in FIGS. 1 and 2). The USB UICC memory correlation table 500 may include a number of columns for storing data relevant to the combined USB UICC memories and their underlying USB UICC memories. In various embodiments, the columns may include a combined USB UICC memory identifier (ID) column 502 that may contain ID values that uniquely identifies each combined USB UICC memory for a multi-slot communication device (e.g., 110, 120, 200 in FIGS. 1 and 2). The columns may also include at least two USB UICC ID ("x") columns 504, 506, 508 that may contain ID values that uniquely identify each USB UICC used for a combined USB UICC memory. In various embodiments, the unique USB UICC ID may be at least a portion of an international mobile subscriber identity (IMSI), or the like, used to connect to and identify the USB UICC on a cellular network. The columns may also include at least two USB UICC memory range ("pr") columns 510, 512, 514 that may contain indicators of ranges of physical of the USB UICC memories used for a combined USB UICC memory. The columns may further include at least two combined USB UICC memory range ("vr") columns 524, 526, 528 that may contain indicators of ranges of virtual addresses of the USB UICC memories used for a combined USB UICC memory. In various embodiments, the indicator of a range of virtual addresses for a combined USB UICC memory may be unique to each combined USB UICC memory. The number of USB UICC ID columns 504, 506, 508 and USB UICC memory range columns 510, 512, 514 may vary depending on the number different of USB UICCs used to form different combined USB UICC memories. For example, a combined USB UICC memory using more than two USB UICC memories or a second combined USB UICC memory using at least one different USB UICC memory than a first combined USB UICC memory may introduce at least a third USB UICC memory to the USB UICC memory correlation table 500. To accommodate the third USB UICC memory, additional USB UICC ID columns 504, 506, 508 and USB UICC memory range columns 510, 512, 514 may be added to the USB UICC memory correlation table 500. Similarly, in response to deletion of the second combined USB UICC memory, one or more USB UICC ID columns 504, 506, 508 and USB UICC memory range columns 510, 512, 514 may be removed from the USB UICC memory correlation table 500.

The USB UICC memory correlation table 500 may include at least one row or entry 516, 518, 520, 522 containing data, for each of the appropriate columns 502, 504, 506, 508, 510, 512, 514, 524, 526, 528, representing a respective combined USB UICC memory. For example, row 516 may represent the first combined USB UICC memory, and contain data for the combined USB UICC memory identifier ID column 502, at least two of the USB UICC ID columns 504, 506, 508 (in this example in the USB UICC ID columns 504, 506), at least two of the USB UICC memory range columns 510, 512, 514 (in this example in the USB UICC memory range columns 510, 512), and in the combined USB UICC memory range columns 524, 526, 528 (in this example in the combined USB UICC memory range columns 524, 526). In various examples, the USB UICC ID column 508, the USB UICC memory range column 514, and the combined USB UICC memory range column 528 may exist in the USB UICC memory correlation table 500, and in the row 516 representing the first combined USB UICC memory, even when the first combined USB UICC memory does not use the USB UICC associated with these columns 508, 514, 528. In such examples, these columns 508, 514, 528 in row 516 may be left blank, contain a null value, or contain another value indicating not to use these columns 508, 514, 528 for the first combined USB UICC memory.

In various embodiments, different rows 516, 518, 520, 522 may contain data in the same columns 502, 504, 506, 508, 510, 512, 514, 524, 526, 528 with different values to represent different combined USB UICC memories using different parts of the same USB UICC memories. The number of rows 516, 518, 520, 522 may vary depending on the number of different combined USB UICC memories used by the multi-slot communication device. The rows 516, 518, 520, 522 may be added or removed from the USB UICC memory correlation table 500 in response to the creation of a new or deletion of an existing combined USB UICC memory. The data in the rows 516, 518, 520, 522 and columns 502, 504, 506, 508, 510, 512, 514, 524, 526, 528 may be updated in response to changes to the combined USB UICC memories.

In various embodiments, the multi-slot communication device may store various USB UICC memory correlation tables 500. In various embodiments, the multi-slot communication device may use other known data structures instead of the USB UICC memory correlation table 500 to store and retrieved data related to the combined USB UICC memories.

Figure 6A:
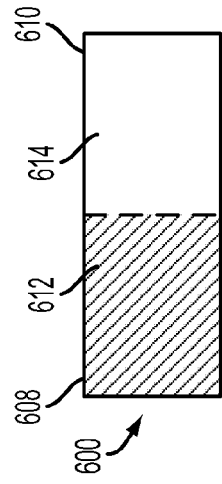
FIGS. 6A-6C are illustrations of combined USB UICC memory on a multi-slot communication device in accordance with various embodiments.
Figure 6B:
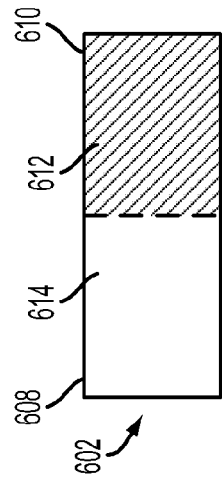
Figure 6C:
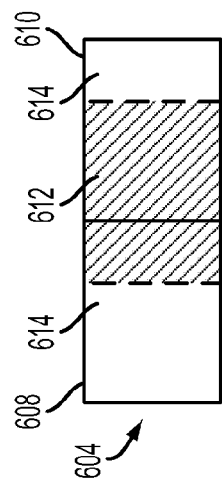
Figure 7A:
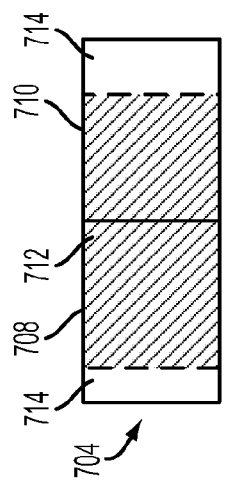
FIGS. 7A-7C are illustrations of combined USB UICC memory on a multi-slot communication device in accordance with various embodiments.
Figure 7B:
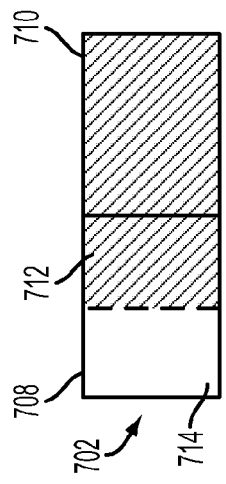
Figure 7C:
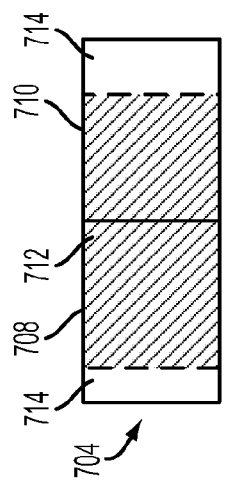

FIGS. 6A-C and 7A-C illustrate combined USB UICC memories 600, 602, 604, 700, 702, 704 on a multi-slot communication device (e.g., 110, 120, 200 in FIGS. 1 and 2) in accordance with various embodiments. With reference to FIGS. 1-7C, the combined USB UICC memories 600, 602, 604, 700, 702, 704 include at least a portion of a memory space of a first USB UICC having a first USB UICC memory 608, 708 and at least a portion of a memory space of a second USB UICC having a second USB UICC memory 610, 710. The portions of the memory spaces of the first and second USB UICCs may include all or a portion of the memory spaces, or all or a portion of an available memory space not dedicated for another use in the memory spaces. The combined USB UICC memories 600, 602, 604, 700, 702, 704 may provide for storage of data 612, 712. In various embodiments, the data 612, 712 may represent a single file or a group of files related to a read or write memory access request. For example, the memory access request may be to store or retrieve a single file or a group of files to or from a combined USB UICC memory 600, 602, 604, 700, 702, 704 as one transaction. In various embodiments, the data 612 may be less than or equal to the size of the first or second USB UICC memories 608, 610. In various embodiments, the data 712 may be greater than the size of the first or second USB UICC memories 708, 710 as illustrated in FIGS. 7A-7C.

The example in FIG. 6A illustrates the combined USB UICC memory 600 storing the data 612 completely within the first USB UICC memory 608. The combined USB UICC memory manager (e.g., 410 in FIG. 4) may receive a memory access request to store the data 612 to the combined USB UICC memory 600. The combined USB UICC memory manager may determine where there is memory space within the combined USB UICC memory 600 among the first and second USB UICC memories 608, 610 to store the data 612. In the example illustrated in FIG. 6A, the combined USB UICC memory manager may determine that the data 612 fits within a memory space on the first USB UICC memory 608. The combined USB UICC memory manager may associate in a memory map/table the virtual address of the memory access request to write the data 612 with the physical address of the first USB UICC memory 608 where the data 612 is stored. The combined USB UICC memory manager may respond to a memory access request to read the data 612 by translating the virtual address of the read memory access request to the physical address of the first USB UICC memory 608 using the memory map/table, and accessing and returning the data 612 from the physical address. The memory space 614 in the combined USB UICC memory 600 may represent the remaining memory space, available and/or full, of the combined USB UICC memory 600 while the data 612 is stored.

In the example illustrated in FIG. 6B, the combined USB UICC memory 602 stores the data 612 completely within the second USB UICC memory 610. This example is similar to the example in relation to the combined USB UICC memory 600, except that the memory space that fits the data 612 is located in the second USB UICC memory 610. Thus, the described combined USB UICC memory manager functions and interactions occur in relation to the second USB UICC memory 610.

The example in FIG. 6C illustrates the combined USB UICC memory 604 storing the data 612 partially in the first USB UICC memory 608 and partially in the second USB UICC memory 610. In this example, the combined USB UICC memory manager may determine that the data 612 fits within a memory space split between the first USB UICC memory 608 and the second USB UICC memory 610 in response to a write memory access request for the data 612. The combined USB UICC memory manager may associate in a memory map/table the virtual address of the memory access request to write the data 612 with the physical addresses of the first USB UICC memory 608 and the second USB UICC memory 610 where the data 612 is stored. The combined USB UICC memory manager may respond to a memory access request to read the data 612 by translating the virtual address of the read memory access request to the physical addresses of the first and second USB UICC memories 608, 610 using the memory map/table, and accessing and returning the data 612 from the physical addresses. The memory spaces 614 in the combined USB UICC memory 604 may represent the remaining memory spaces, available and/or full, of the combined USB UICC memory 604 while the data 612 is stored.

The example in FIG. 7A illustrates the combined USB UICC memory 700 storing the data 712 partially in the first USB UICC memory 708 and partially in the second USB UICC memory 710. The data 712 uses the entire first USB UICC memory 708 and part of the second USB UICC memory 710. A combined USB UICC memory manager (e.g., 410 in FIG. 4) may receive a memory access request to store the data 712 to the combined USB UICC memory 700. The combined USB UICC memory manager may determine where there is memory space within the combined USB UICC memory 700 among the first and second USB UICC memories 708, 710 to store the data 712. In this example, the combined USB UICC memory manager may determine that the data 712 fits within all the memory space on the first USB UICC memory 708 and part of the second USB UICC memory 710. The combined USB UICC memory manager may associate in a memory map/table the virtual address of the memory access request to write the data 712 with the physical addresses of the first USB UICC memory 708 and the second USB UICC memory 710 where the data 712 is stored. The combined USB UICC memory manager may respond to a memory access request to read the data 712 by translating the virtual address of the read memory access request to the physical addresses of the first and second USB UICC memories 708, 710 using the memory map/table, and accessing and returning the data 712 from the physical addresses. The memory space 714 in the combined USB UICC memory 700 may represent the remaining memory space, available and/or full, of the combined USB UICC memory 700 while the data 712 is stored.

The example in FIG. 7B illustrates the combined USB UICC memory 702 storing the data 712 partially in the first USB UICC memory 708 and partially in the second USB UICC memory 710. The data 712 uses part of the first USB UICC memory 708 and the entire second USB UICC memory 710. This example is similar to the example in relation to the combined USB UICC memory 700, except that the memory space that fits the data 712 is located in the first and second USB UICC memories 708, 710 in an opposite arrangement. Thus, the combined USB UICC memory manager functions and interactions described with reference to the combined USB UICC memory 700 example occur in relation to the second USB UICC memory 710 as they are described for the first USB UICC memory 708, and in relation to the first USB UICC memory 708 as they are described for the second USB UICC memory 710.

The example in FIG. 7C illustrates the combined USB UICC memory 704 storing the data 712 partially in the first USB UICC memory 708 and partially in the second USB UICC memory 710. In this example, the combined USB UICC memory manager may determine that the data 712 fits within a memory space split between the first USB UICC memory 708 and the second USB UICC memory 710 in response to a write memory access request for the data 712. The combined USB UICC memory manager may associate in a memory map/table the virtual address of the memory access request to write the data 712 with the physical addresses of the first USB UICC memory 708 and the second USB UICC memory 710 where the data 712 is stored. The combined USB UICC memory manager may respond to a memory access request to read the data 712 by translating the virtual address of the read memory access request to the physical addresses of the first and second USB UICC memories 708, 710 using the memory map/table, and accessing and returning the data 712 from the physical addresses. The memory spaces 714 in the combined USB UICC memory 704 may represent the remaining memory spaces, available and/or full, of the combined USB UICC memory 704 while the data 712 is stored.

FIGS. 8A-C and 9A-C illustrate combined USB UICC memories 800, 802, 804, 900, 902, 904 on a first multi-slot communication device (e.g., 110, 120, 200 in FIGS. 1 and 2) in accordance with various embodiments. With reference to FIGS. 1-9C, the combined USB UICC memories 800, 802, 804, 900, 902, 904 include at least a portion of a memory space of a first USB UICC having a first USB UICC memory 808, 908 on the first multi-slot communication device. The combined USB UICC memories 800, 802, 804, 900, 902, 904 also include at least a portion of a memory space of a second/remote USB UICC having a second/remote USB UICC memory 810, 910 on a second multi-slot communication device (e.g., 110, 120, 200 in FIGS. 1 and 2). The portions of the memory spaces of the first and second USB UICCs may include all or a portion of the memory spaces, or all or a portion of an available memory space not dedicated for another use in the memory spaces. The combined USB UICC memories 800, 802, 804, 900, 902, 904 may provide for storage of data 812, 912. In various embodiments, the data 812, 912 may represent a single file or a group of files related to a read or write memory access request on the first multi-slot communication device. For example, the memory access request may be to store or retrieve a single file or a group of files to or from a combined USB UICC memory 800, 802, 804, 900, 902, 904 as one transaction. In various embodiments, the data 812 may be less than or equal to the size of the first or second USB UICC memories 808, 810. In various embodiments, the data 912 may be greater than the size of the first or second USB UICC memories 908, 910.

The examples illustrated in FIGS. 8A-C are similar to the examples illustrated in FIGS. 6A-C, and the examples illustrated in FIGS. 9A-C are similar to the examples illustrated in FIGS. 7A-C, except that the combined USB UICC memories 800, 802, 804, 900, 902, 904 are divided among multiple multi-slot communication devices. To implement memory access requests that access both USB UICC memories 808, 810, 908, 910, a combined USB UICC memory manager (e.g., 410 in FIG. 4) of the first multi-slot communication device may communicate with a remote combined USB UICC memory manager of the second multi-slot communication device via a wireless connection 816. In various embodiments, the wireless connection 816 may be made through two-way wireless communication links, such as 4G, 3G, CDMA, TDSCDMA, WCDMA, GSM, and other mobile telephony communication technologies. The wireless connection 816 may include various other wireless connections, including WLANs and PANs, such as Wi-Fi based on IEEE 802.11 standards, Bluetooth, and near field communication.

In various embodiments, at least one of the combined USB UICC memory managers may use a memory map/table to translate the combined USB UICC memory virtual memory address of the memory access requests to the USB UICC memory physical address(es). The combined USB UICC memory manager implementing the address translation and the memory map/table may reside on the same multi-slot communication device. In various embodiments, the combined USB UICC memory manager implementing the address translation may provide instructions and addresses such that the combined USB UICC memory manager may communicate with a remote memory manager of another type to interact with the remote USB UICC memories 808, 810, 908, 910 in order to implement the combined USB UICC memory.

In various embodiments, the second USB UICC having the second USB UICC memory 810, 910 may be connected to a computing device, which may include any computing device (e.g. 1500, 1600 in FIGS. 15 and 16) with an integrated or peripheral memory device interface slot (e.g., 202a and 202b in FIGS. 2 and 3) and integrated or peripheral capabilities to communicate via the wireless connection 816. It may not be necessary that the second USB UICC be connected to a multi-slot communication device.

The examples illustrated in FIGS. 6A-9C depict combined USB UICC memories 600, 602, 604, 700, 702, 704, 800, 802, 804, 900, 902, 904 including two USB UICC memories 608, 610, 708, 710, 808, 810, 908, 910. These examples only represent the minimum number of USB UICC memories for making up a combined USB UICC memory. Similar examples may include combined USB UICC memories with more than two USB UICC memories in which data may be read to and from across two or more USB UICC memories. Other examples combine USB UICC memories 608, 610, 708, 710, 808, 810, 908, 910 with UICC memories that communicate using communication protocols other than USB communication protocols.

Figure 10:
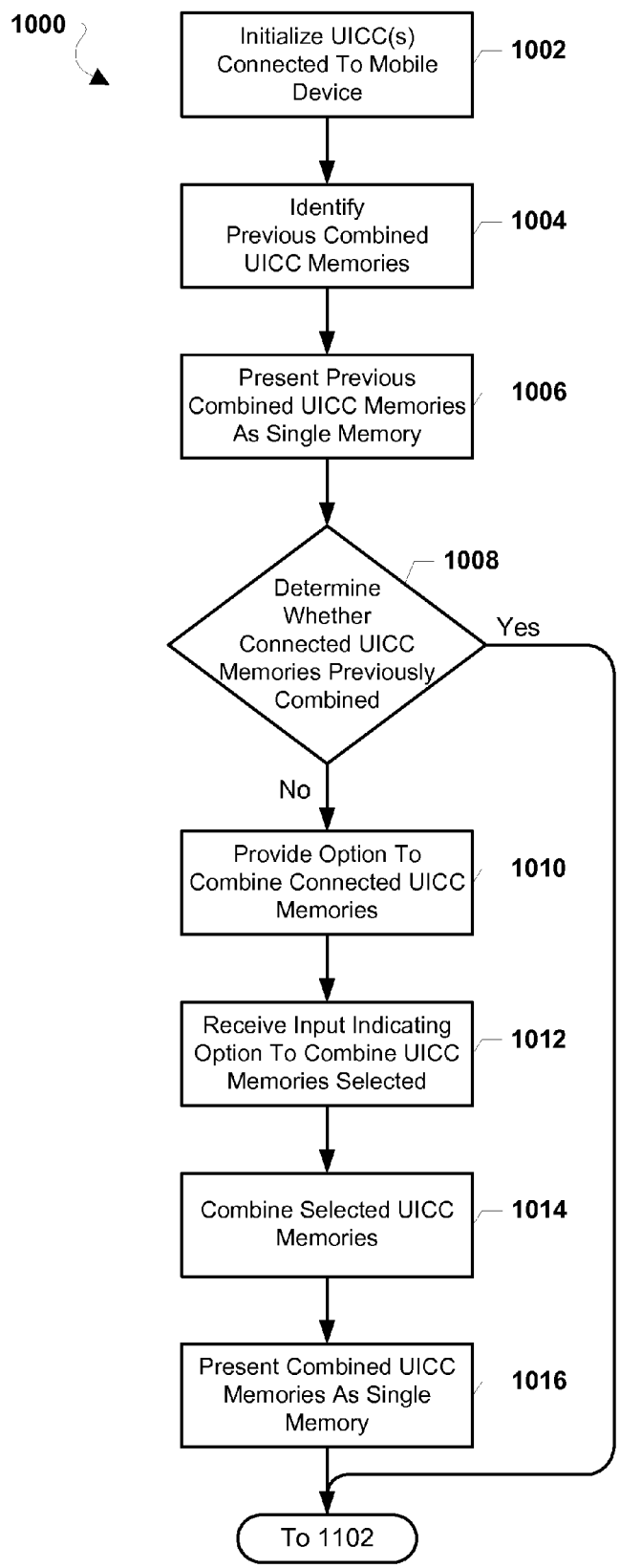
FIG. 10 is a process flow diagram illustrating a method for providing a combined USB UICC memory in accordance with various embodiments.

FIG. 10 illustrates a method 1000 for providing a combined USB UICC memory (e.g., 600, 602, 604, 700, 702, 704, 800, 802, 804, 900, 902, 904 in FIGS. 6A-9C) on a multi-slot communication device (e.g., 110, 120, 200 in FIGS. 1 and 2) in accordance with various embodiments. The method 1000 may be executed in a computing device, such as a multi-slot communication device (e.g., 110, 120, 200 in FIGS. 1 and 2) using software, general purpose or dedicated hardware, or a combination of software and hardware, such as a general purpose processor (e.g., 206 FIG. 2), a baseband processor (e.g., 216 in FIG. 2), a combined USB UICC memory manager (e.g., 410 in FIG. 4) or the like.

With reference to FIGS. 1-10, in block 1002, the multi-slot communication device may initiate at least one electrically connected USB UICC. The connected USB UICC(s) may be connected to a memory device interface slot(s) (e.g., 202a and 202b in FIGS. 2 and 3).

In block 1004, the multi-slot communication device may identify a previously combined USB UICC memory. The previously combined USB UICC memory may be identified by retrieving data from an entry (e.g., 516, 518, 520, 522 in FIG. 5) in a USB UICC memory correlation table (e.g., 500 in FIG. 5).

In block 1006, the multi-slot communication device may provide the identified previously combined USB UICC memory as a combined, contiguous, single USB UICC memory, such as displaying a combined memory USB UICC on a display (e.g., 226, 1412, 1519 in FIGS. 2, 14, and 15) of the multi-slot communication device. Example displays of the combined USB UICC memory may include an icon, a memory directory path, a graphical or text based representation of the memory space (including free and used memory space) of the combined USB UICC memory. In various embodiments, the displays may indicate that the combined USB UICC is a combination of at least two of the USB UICC memories (e.g., 418a-c, 608, 610, 708, 710, 808, 810, 908, 910 in FIGS. 4 and 6A-9C) including an indication of which of the USB UICC memories are included in the combined USB UICC memory. In various embodiments, the displays may indicate the combined USB UICC memory without an indication that is a combination of at least two of the USB UICC memories.

In determination block 1008, the multi-slot communication device may determine whether connected USB UICC memories make up a previously combined USB UICC memory. The multi-slot communication device may compare a unique USB UICC ID of each connected USB UICC having one of the connected USB UICC memories to the same data stored in the USB UICC memory correlation table for each entry. Matching unique USB UICC IDs for at least two connected USB UICCs to all of the same data in at least a same entry in the USB UICC memory correlation table may indicate that the connected USB UICC memories make up a previously combined USB UICC memory. As discussed (e.g., with reference to FIG. 5), the unique USB UICC ID may be at least a portion of an international mobile subscriber identity (IMSI), or the like, used to connect the USB UICC and to identify the USB UICC on a cellular network.

In response to determining that the connected USB UICC memories do not make up a previously combined USB UICC memory (i.e., determination block 1008="No"), the multi-slot communication device may provide an option to combine the connected USB UICC memories to create a combined USB UICC memory in block 1010. Much like the display of the combined USB UICC memories in block 1006, the option to combine the connected USB UICC memories may be provided via the display of the multi-slot communication device in a graphical and/or text form. The option may be provided automatically as, for example, a pop-up or dialogue box with interactive response elements to accept or decline the option to combined. Other interactive response elements may be provided to provide options for combining the connected USB UICC memories. In various embodiments, the option may be provided within an options or settings interface/menu in which the user may manually choose to view the option and respond to interactive elements for indicating a request to combine the USB UICC memories. A user may interact with the multi-slot communication device to provide an input responding to the provided option to combine the USB UICC memories, and in block 1012, the multi-slot communication device may receive the input indicating selection of the option to combine the connected USB UICC memories. In various embodiments, the input may indicate a selection of specific USB UICC memories for combination. In various embodiments, the input may indicate a combination of USB UICC memories selected for combination by the multi-slot communication device.

Figure 11:
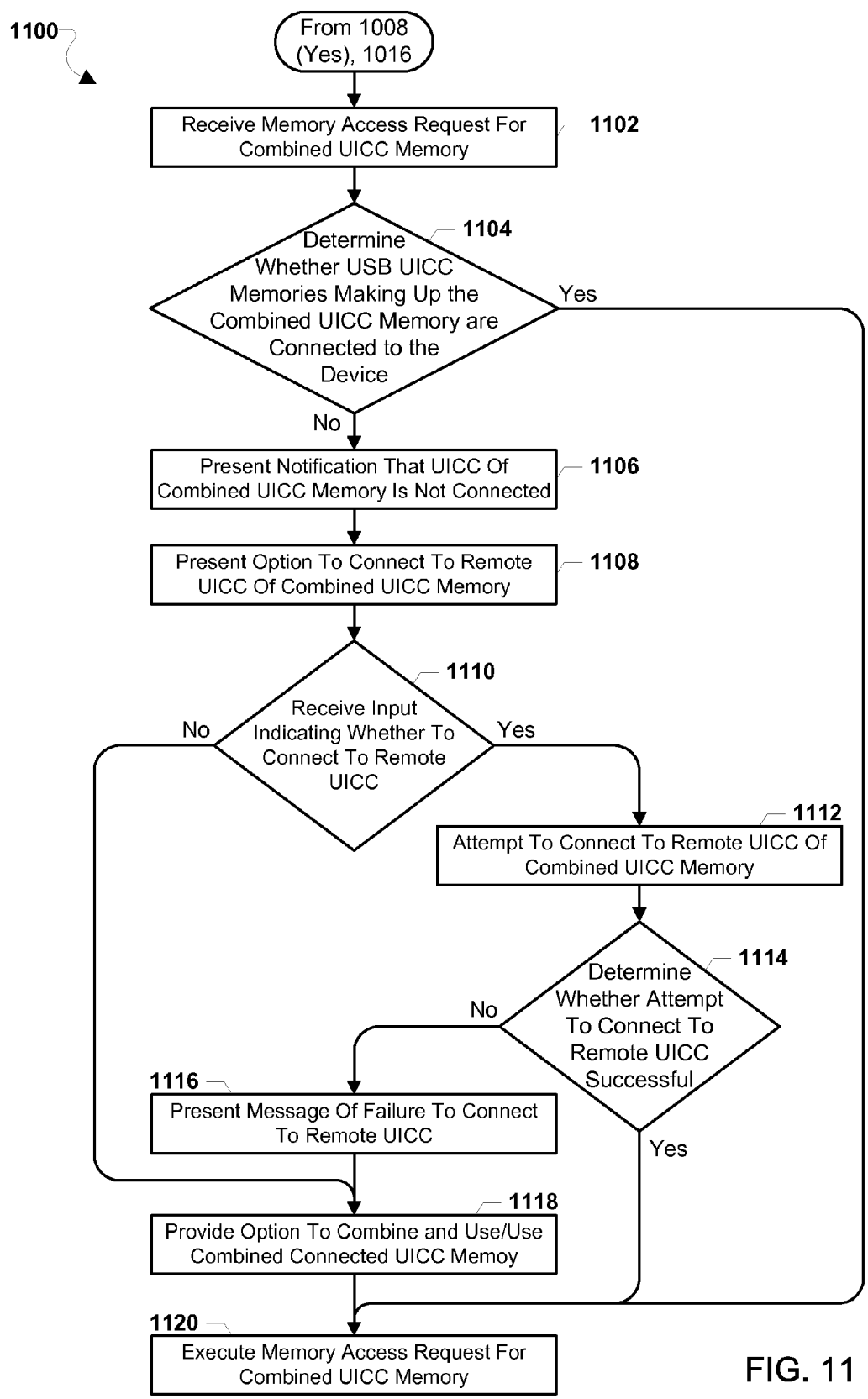
FIG. 11 is a process flow diagram illustrating a method for handling a memory access request to a combined USB UICC memory in accordance with various embodiments.
Figure 12:
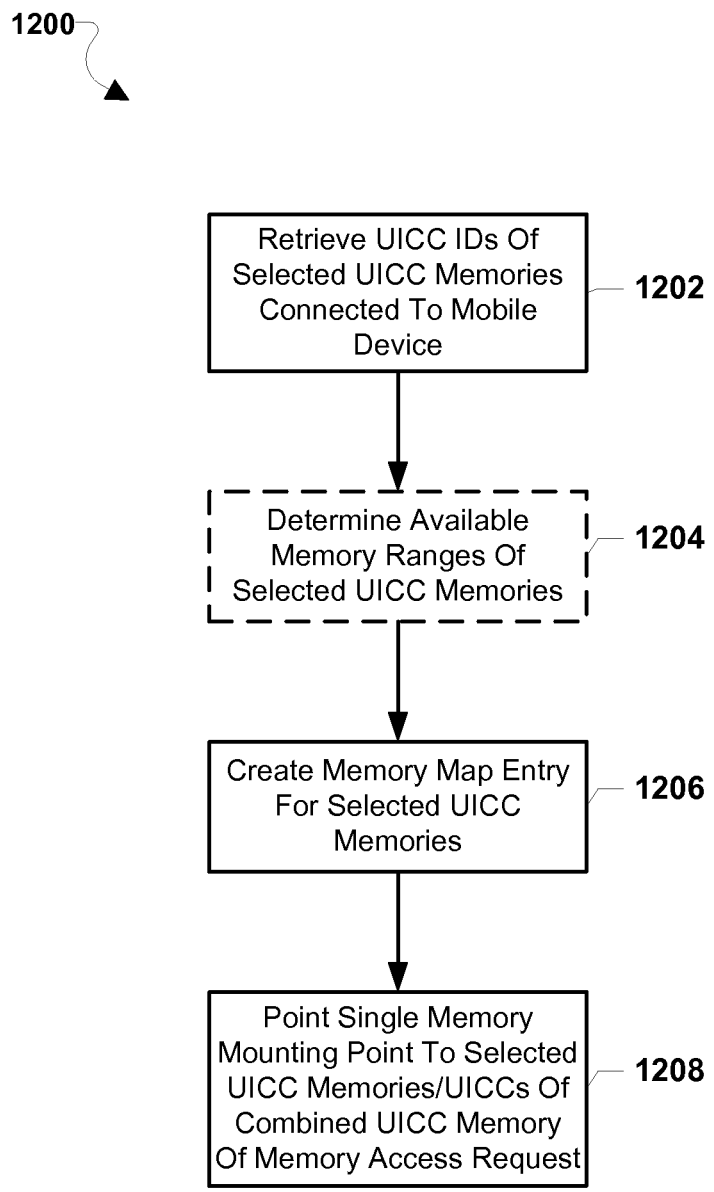
FIG. 12 is a process flow diagram illustrating a method for combining USB UICC memories in accordance with various embodiments.

In block 1014, the multi-slot communication device may combine the selected USB UICC memories (e.g., as described further with reference to FIG. 12). In block 1016, the multi-slot communication device may provide the combined USB UICC memory, made up of the selected USB UICC memories, in a similar manner as in block 1006. The multi-slot communication device may receive a memory access request for a combined USB UICC memory (e.g., as described with reference to block 1102 in FIG. 11). Similarly, in response to determining that the connected USB UICC memories do make up a previously combined USB UICC memory (i.e., determination block 1008="Yes"), the multi-slot communication device may receive a memory access request for a combined USB UICC memory as described with reference to block 1102 in FIG. 11.

FIG. 11 illustrates a method 1100 for handling a memory access request to a combined USB UICC memory (e.g., 600, 602, 604, 700, 702, 704, 800, 802, 804, 900, 902, 904 in FIGS. 6A-9C) on a multi-slot communication device (e.g., 110, 120, 200 in FIGS. 1 and 2) in accordance with various embodiments. The method 1100 may be executed in a computing device, such as a multi-slot communication device (e.g., 110, 120, 200 in FIGS. 1 and 2) using software, general purpose or dedicated hardware, or a combination of software and hardware, such as a general purpose processor (e.g., 206 FIG. 2), a baseband processor (e.g., 216 in FIG. 2), a combined USB UICC memory manager (e.g., 410 in FIG. 4) or the like.

With reference to FIGS. 1-11, in block 1102, the multi-slot communication device may receive a memory access request for a virtual address of the combined USB UICC memory. In various embodiments, the memory access request may originate at the application layer (e.g., 420 in FIG. 4) and be received at the combined USB UICC memory manager (e.g., 410 in FIG. 4) at the middle layer (e.g., 408 in FIG. 4). The memory access request may specify a type of memory access request, such as a read or write request and a virtual address of the combined USB UICC memory to indicate a location for executing the memory access request. The memory access request may further provide data for writing to the virtual address of the combined USB UICC memory for a write request.

In determination block 1104, the multi-slot communication device may determine whether the USB UICC memories (e.g., 418*a-c*, 608, 610, 708, 710, 808, 810, 908, 910 in FIGS. 4 and 6A-9C) that make up the combined USB UICC memory are electrically connected to the multi-slot communication device. The multi-slot communication device may retrieve the USB UICC IDs for the USB UICC memories that make up the combined USB UICC memory from the USB UICC memory correlation table (e.g., 500 in FIG. 5) and from the connected USB UICC memories, and compare them. A match for all of the USB UICC IDs for the USB UICC memories that make up the combined USB UICC memory to the connected USB UICC memories may indicate that the necessary USB UICC memories are electrically connected to the multi-slot communication device. A miss on any of the USB UICC IDs for the USB UICC memories that make up the combined USB UICC memory may indicate that not all of the USB UICC memories that make up the combined USB UICC memory are electrically connected to the multi-slot communication device.

In response to determining that not all of the USB UICC memories that make up the combined USB UICC memory are electrical connected to the multi-slot communication device (i.e., determination device 1104="No"), the multi-slot communication device may provide a notification that at least one of the USB UICC memories of the combined USB UICC memory is not connected to the multi-slot communication device in block 1106. In block 1108, the multi-slot communication device may provide an option to connect to a remote USB UICC memory (e.g., 808, 810, 908, 910 in FIGS. 8A-C and 9A-C). The notification in block 1106 of the message and the option in block 1108 may be similar to the displays made in blocks 1006 and 1016 (e.g., as described with reference to FIG. 10).

In determination block 1110, the multi-slot communication device may receive an input indicating whether to connect to the remote USB UICC memory via a wireless connection (e.g., 132, 142, 816 as described with reference to FIGS. 1, 8A-C, and 9A-C). The input may indicate an instruction for the multi-slot communication device is to connect to the remote USB UICC memory via the wireless connection, or to not connect to the remote USC UICC memory.

In response to the received input indicating the instruction for the multi-slot communication device to connect to the remote USB UICC memory via the wireless connection (i.e., determination block 1110="Yes"), the multi-slot communication device may attempt to connect to the remote USB UICC of the combined UICC memory in block 1112. In various embodiments, the multi-slot communication device may use the unique USB UICC ID of the remote USB UICC memory from the USB UICC memory correlation table to attempt a connection with the remote USB UICC memory over the wireless network or another network using a different protocol. For example, the unique USB UICC ID may be the international mobile subscriber identity (IMSI) of the USB UICC on which the remote USB UICC memory is located.

The multi-slot communication device may attempt to connect via a cellular network using the IMSI to identify to the cellular network the USB UICC to which a connection is desired. Similarly, the unique USB UICC ID may allow for the multi-slot communication device to detect and recognize the remote USB UICC having the remote USB UICC memory connected to another computing device over a WLAN or PAN.

When the multi-slot communication device is provided a connection to the another computing device in which the USB UICC is installed, the two devices may engage in a handshake exchange of information to enable a data connection to the USB UICC. In some implementations the data connection may be established via the cellular network over which access to the USB UICC was requested. In some implementations the data connection may be established after the handshake exchange via a different network using a different protocol, such as a WLAN, a Bluetooth data link, a WiFi Direct data link, etc. Further, the remote USB UICC may decide to offload the data to a third memory location and provide details of that other memory location to the multi-slot communication device in order to avoid a lengthy data link with the requesting multi-slot communication device. Upon receiving such message, the multi-slot communication device may update its table with new location of data that was earlier associated with remote USB UICC. Computing device in which the USB UICC is installed may also indicate whether it is removing the data from memory once offloaded to a third memory location, thus indicating to the requesting multi-slot communication device that it can to permanently update its table.

In determination block 1114, the multi-slot communication device may determine whether the attempt to connect to the remote USB UICC memory is successful. In response to determining that the attempt to connect to the remote USB UICC memory was unsuccessful (i.e., determination block 1114="No"), the multi-slot communication device may provide a message indicating the failure to connect to the remote USB UICC memory in block 1116. In block 1118, the multi-slot communication device may provide an option to combine and use the connected USB UICC memories, or use the already combined USB UICC memory connected to the multi-slot communication device for the memory access request. The message provided in block 1116 and the option provided in block 1118 may be similar to the displays made in blocks 1006 and 1016 (e.g., as described with reference to FIG. 10). In block 1120, the multi-slot communication device may execute the memory access request using the combined USB UICC memory. The memory access request may be executed (e.g., as described with reference to FIGS. 4 and 13). In response to determining that the attempt to connect to the remote USB UICC memory is successful (i.e., determination block 1114="Yes"), the multi-slot communication device may execute the memory access request using the combined USB UICC memory in block 1120.

In response to determining that all of the USB UICC memories that make up the combined USB UICC memory are electrically connected to the multi-slot communication device (i.e., determination device 1104="Yes"), the multi-slot communication device may execute the memory access request using the combined USB UICC memory in block 1120. In response to receiving input indicating that the multi-slot communication device should not connect to the remote USB UICC memory via the wireless connection (i.e., determination block 1110="No"), the multi-slot communication device may provide the option to combine and use the connected USB UICC memories, or use the already combined USB UICC memory connected to the multi-slot communication device for the memory access request in block 1118.

FIG. 12 illustrates a method 1200 for combining connected USB UICC memories (e.g., 418a-c, 608, 610, 708, 710 in FIGS. 4, 6A-C, and 7A-C) in accordance with various embodiments. The method 1200 may be executed in a computing device, such as a multi-slot communication device (e.g., 110, 120, 200 in FIGS. 1 and 2) using software, general purpose or dedicated hardware, or a combination of software and hardware, such as a general purpose processor (e.g., 206 FIG. 2), a baseband processor (e.g., 216 in FIG. 2), a combined USB UICC memory manager (e.g., 410 in FIG. 4) or the like.

With reference to FIGS. 1-12, in block 1202, the multi-slot communication device may retrieve the unique USB UICC IDs of the connected USB UICCs having selected USB UICC memories. The multi-slot communication device may retrieve the unique USB UICC IDs by querying the connected USB UICCs for their unique USB UICC IDs. The selected USB UICC memories may be selected (e.g., in accordance with the descriptions of block 1012 in FIG. 10).

In optional block 1204, the multi-slot communication device may determine available USB UICC memory ranges of the USB UICC memories on the selected, connected USB UICCs. The multi-slot communication device may determine the available USB UICC memory ranges by querying or testing the USB UICC memories on the connected USB UICCs.

In block 1206, the multi-slot communication device may create a memory map/USB UICC memory correlation table entry (e.g., 516, 518, 520, 522 in FIG. 5) for the selected USB UICC memories. The entry may be created, for example, by writing the data, including at least the unique USB UICC IDs of the selected USB UICC memories, of an entry to the USB UICC memory correlation table (e.g., 500 in FIG. 5). The memory map for the selected USB UICC memories may correlate physical addresses of the USB UICC memories with virtual addresses of the combined USB UICC memory. In block 1208, the multi-slot communication device may point a single memory mounting point to the selected USB UICC memories.

Figure 13:
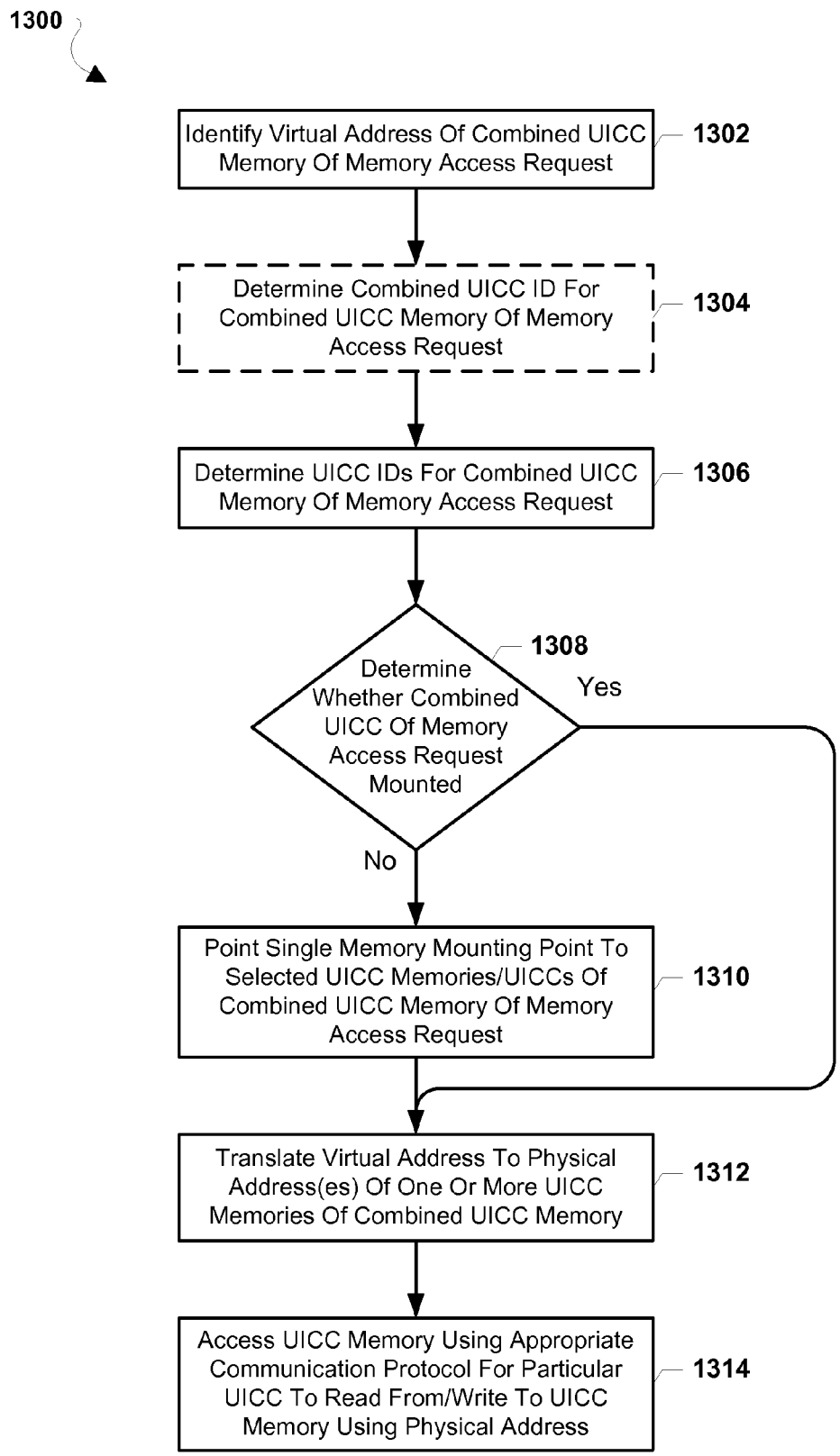
FIG. 13 is a process flow diagram illustrating a method for executing a memory access request to a combined USB UICC memory in accordance with various embodiments.

FIG. 13 illustrates a method 1300 for executing a memory access request to a combined USB UICC memory (e.g., 600, 602, 604, 700, 702, 704, 800, 802, 804, 900, 902, 904 in FIGS. 6A-9C) of a multi-slot communication device (e.g., 110, 120, 200 in FIGS. 1 and 2) in accordance with various embodiments. The method 1300 may be executed in a computing device, such as a multi-slot communication device (e.g., 110, 120, 200 in FIGS. 1 and 2) using software, general purpose or dedicated hardware, or a combination of software and hardware, such as a general purpose processor (e.g., 206 FIG. 2), a baseband processor (e.g., 216 in FIG. 2), a combined USB UICC memory manager (e.g., 410 in FIG. 4) or the like.

With reference to FIGS. 1-13, in block 1302, the multi-slot communication device may identify a virtual address of the combined USB UICC memory provided by the memory access request. The memory access request may originate from the application layer (e.g., 420 FIG. 4), which is unaware of the separate USB UICCs memories (e.g., 418a-c, 608, 610, 708, 710, 808, 810, 908, 910 in FIGS. 4 and 6A-9C) that make up the combined USB UICC memory. To read or write to the USB UICC memories, the memory access request may be made to the virtual representation of the combined USB UICC memory as a single, contiguous USB UICC memory using virtual addresses of the combined USB UICC memory. The memory access request may provide the data necessary to identify the virtual address of the combined USB UICC memory.

In optional block 1304, the multi-slot communication device may determine a unique combined USB UICC memory ID (e.g., data in column 502 in FIG. 5) for the combined USB UICC memory ID of the memory access request. In various embodiments, the memory access request may contain unique combined USB UICC memory ID to identify the combined USB UICC for implementing the memory access request. This may aid the multi-slot communication device to identify the combined USB UICC in the USB UICC memory correlation table (e.g., 500 in FIG. 5) from among a number of combined USB UICCs which may be available to the multi-slot communication device.

In block 1306, the multi-slot communication device may determine the unique USB UICC IDs (e.g., that data in columns 504, 506, 508 in FIG. 5) associated with the USB UICC memories that make up the combined USB UICC memory of the memory access request. In various embodiments, the multi-slot communication device may retrieve the unique USB UICC IDs associated with the USB UICC memories that make up the combined USB UICC memory from the entry (e.g., 516, 518, 520, 522 in FIG. 5) in the USB UICC memory correlation table associated with the unique combined USB UICC memory ID. It may not be necessary to use a unique combined USB UICC memory ID, for example, in response to only one combined USB UICC memory being active for the multi-slot communication device. In various embodiments, the multi-slot communication device may also provide different ranges of virtual addresses for various combined USB UICC memories. It may be sufficient to use the virtual address of the memory access request compared to the combined USB UICC memory range (e.g., data in columns 524, 526, 528 in FIG. 5) to locate the entry in the USB UICC memory correlation table having the unique USB UICC IDs associated with the USB UICC memories that make up the combined USB UICC memory.

In determination block 1308, the multi-slot communication device may determine whether the combined USB UICC memory of the memory access request is mounted by the multi-slot communication device. In response to determining that the combined USB UICC memory of the memory access request is not mounted (i.e., determination block 1308="No"), the multi-slot communication device may point a single memory mounting point to the selected USB UICC memories that make up the combined USB UICC memory of the memory access request in block 1310.

In response to determining that the combined USB UICC memory of the memory access request is mounted (i.e., determination block 1308="Yes") or after the multi-slot communication device point a single memory mounting point to the selected USB UICC memories that make up the combined USB UICC memory of the memory access request, the multi-slot communication device may translate the virtual address of the memory access request to a physical address of at least one of the USB UICC memories that make up the combined USB UICC memory of the memory access request in block 1312. As described (e.g., with reference to FIG. 4), the multi-slot communication device may use a data structure, like a memory map, or algorithm to translate between virtual addresses of the combined USB UICC memory and physical addresses of its underlying USB UICC memories.

In block 1314, the multi-slot communication device may access the at least one USB UICC memory using an appropriate communication protocol for the USB UICC memory to read from or write to the USB UICC memory using its physical addresses. In various embodiments, at least USB communication protocols are used to communicate with the at least one of the USB UICC memory of the combined USB UICC memory. In various embodiments, another UICC memory of the combined USB UICC memory may be accessed using the USB communication protocols or other known protocols. In various embodiments, accessing multiple USB UICC memories to read from or write to the USB UICC memory using their physical addresses may allow a file or group of files to be read from or written to the multiple USB UICC memories without being concerned with the memory capacities of any of the individual USB UICC memories. Portions of the file or group of files may be read from or written to physical addresses spanning the multiple USB UICC memories that are represented by contiguous ranges of virtual memory addresses. In other words, a single memory access request transaction from the application layer (e.g., 420 in FIG. 4) may be implemented at the memory layer (e.g., 416 in FIG. 4) as individual memory access request transaction to individual USB UICC memories for various portions of a file or group of files. Further, returns of various portions of a file or group of files from the memory layer may be provided to the application combined into a single response to the single memory access request transaction. Various examples of splitting a file or group of files across the multiple USB UICC memories are described with reference to FIGS. 6A-9C.

Figure 14:
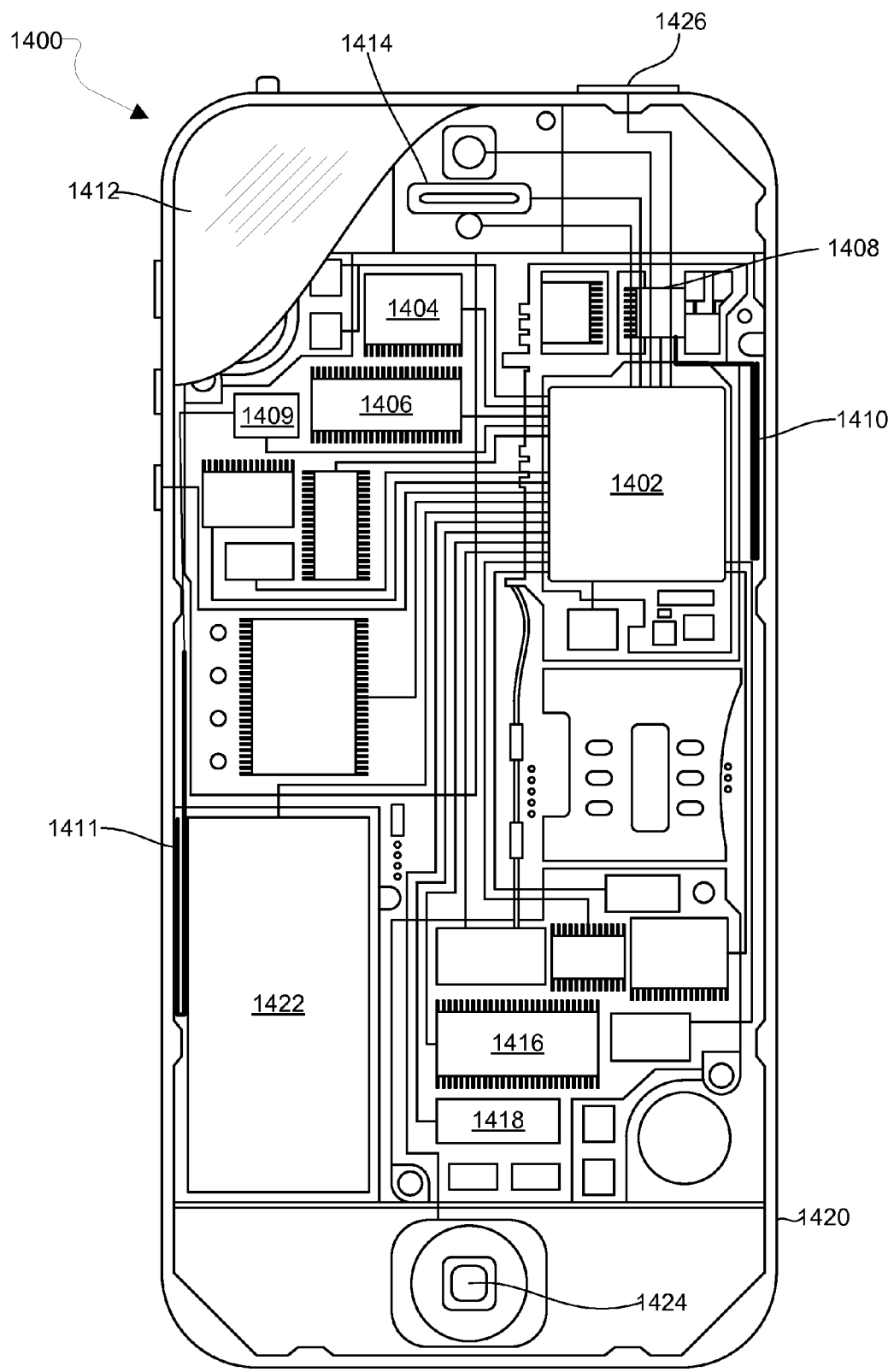
FIG. 14 is a component diagram of an example multi-slot communication device suitable for use with various embodiments.
Figure 15:
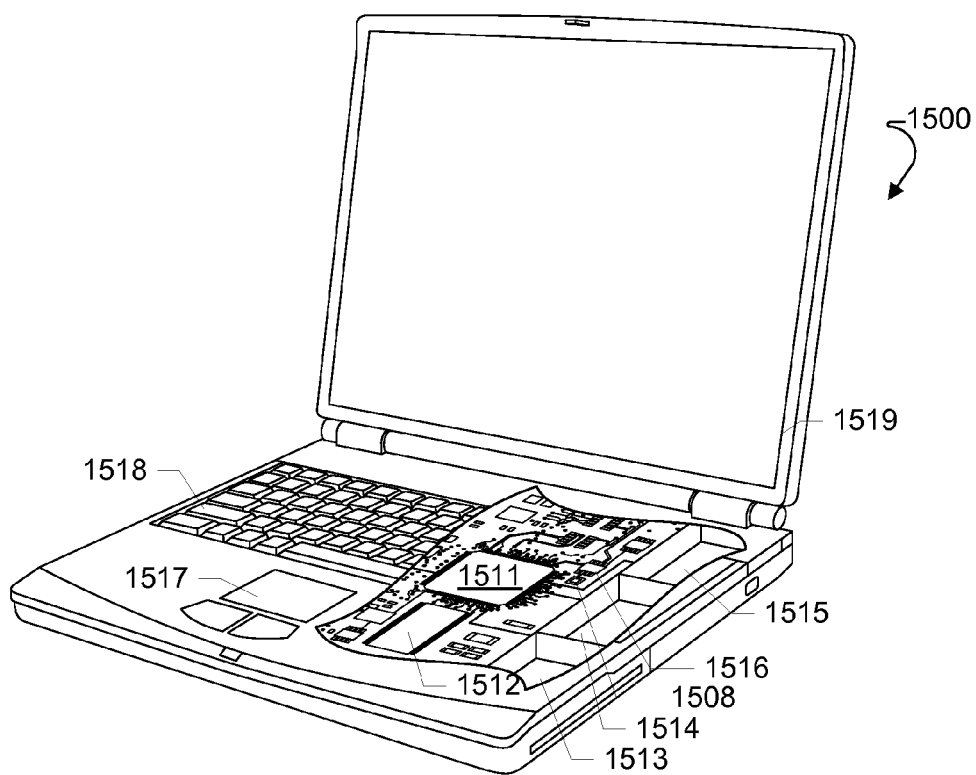
FIG. 15 is component block diagram illustrating an example mobile computing device suitable for use with the various embodiments.

FIG. 14 illustrates an exemplary multi-slot communication device 1400 suitable for use with the various embodiments. The multi-slot communication device 1400 may be similar to the multi-technology device 110, 120, 200 (e.g., FIGS. 1 and 2). With reference to FIGS. 1-14, the multi-slot communication device 1400 may include a processor 1402 coupled to a touchscreen controller 1404 and an internal memory 1406. The processor 1402 may be one or more multicore integrated circuits designated for general or specific processing tasks. The internal memory 1406 may be volatile or non-volatile memory, and may also be secure and/or encrypted memory, or unsecure and/or unencrypted memory, or any combination thereof. The touchscreen controller 1404 and the processor 1402 may also be coupled to a touchscreen panel 1412, such as a resistive-sensing touchscreen, capacitive-sensing touchscreen, infrared sensing touchscreen, etc. Additionally, the display of the multi-slot communication device 1400 need not have touch screen capability.

The multi-slot communication device 1400 may have two or more cellular network transceivers 1408, 1409 coupled to antennae 1410, 1411, for sending and receiving communications via a cellular communication network. The combination of the transceiver 1408 or 1409 and its associated antenna 1410 or 1411, and associated components, is referred to herein as a radio frequency (RF) chain. The cellular network transceivers 1408, 1409 may be coupled to the processor 1402, which is configured with processor-executable instructions to perform operations of the embodiment methods described above. The cellular network transceivers 1408, 1409 and antennae 1410, 1411 may be used with the above-mentioned circuitry to implement the various wireless transmission protocol stacks and interfaces. The multi-slot communication device 1400 may include one or more cellular network wireless modem chips 1416 coupled to the processor and the cellular network transceivers 1408, 1409 and configured to enable communication via cellular communication networks.

The multi-slot communication device 1400 may include a peripheral device connection interface 1418 coupled to the processor 1402. The peripheral device connection interface 1418 may be singularly configured to accept one type of connection, or may be configured to accept various types of physical and communication connections, common or proprietary, such as USB, FireWire, Thunderbolt, or PCIe. The peripheral device connection interface 1418 may also be coupled to a similarly configured peripheral device connection port (not shown).

The multi-slot communication device 1400 may also include speakers 1414 for providing audio outputs. The multi-slot communication device 1400 may also include a housing 1420, constructed of a plastic, metal, or a combination of materials, for containing all or some of the components discussed herein. The multi-slot communication device 1400 may include a power source 1422 coupled to the processor 1402, such as a disposable or rechargeable battery. The rechargeable battery may also be coupled to the peripheral device connection port to receive a charging current from a source external to the multi-slot communication device 1400. The multi-slot communication device 1400 may also include a physical button 1424 for receiving user inputs. The multi-slot communication device 1400 may also include a power button 1426 for turning the multi-slot communication device 1400 on and off.

The various aspects (including, but not limited to, aspects discussed above with reference to FIGS. 1-15) may be implemented in a wide variety of computing systems, which may include a variety of mobile computing devices, such as a laptop computer 1500 illustrated in FIG. 15. With reference to FIGS. 1-15, many laptop computers include a touchpad touch surface 1517 that serves as the computer's pointing device, and thus may receive drag, scroll, and flick gestures similar to those implemented on computing devices equipped with a touch screen display and described above. A laptop computer 1500 will typically include a processor 1511 coupled to volatile memory 1512 and a large capacity nonvolatile memory, such as a disk drive 1513 of Flash memory. Additionally, the computer 1500 may have one or more antenna 1508 for sending and receiving electromagnetic radiation that may be connected to a wireless data link and/or cellular telephone transceiver 1516 coupled to the processor 1511. The computer 1500 may also include a floppy disc drive 1514 and a compact disc (CD) drive 1515 coupled to the processor 1511. In a notebook configuration, the computer housing includes the touchpad 1517, the keyboard 1518, and the display 1519 all coupled to the processor 1511. Other configurations of the computing device may include a computer mouse or trackball coupled to the processor (e.g., via a USB input) as are well known, which may also be used in conjunction with the various aspects.

Figure 16:
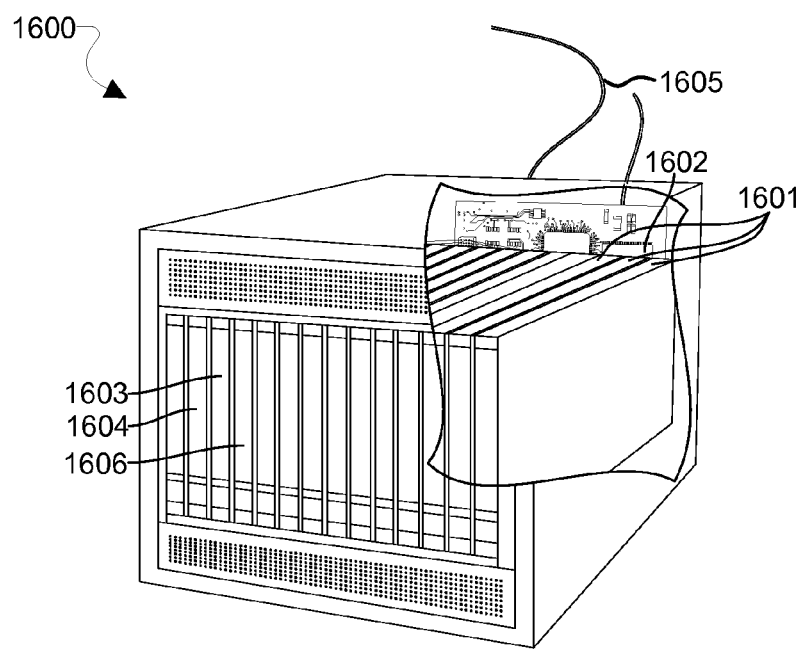
FIG. 16 is component block diagram illustrating an example server suitable for use with the various embodiments.

The various aspects (including, but not limited to, aspects discussed above with reference to FIGS. 1-16) may be implemented in a wide variety of computing systems, which may include any of a variety of commercially available servers for compressing data in server cache memory. An example server 1600 is illustrated in FIG. 16. With reference to FIGS. 1-16, such a server 1600 typically includes one or more multi-core processor assemblies 1601 coupled to volatile memory 1602 and a large capacity nonvolatile memory, such as a disk drive 1604. As illustrated in FIG. 16, multi-core processor assemblies 1601 may be added to the server 1600 by inserting them into the racks of the assembly. The server 1600 may also include a floppy disc drive, compact disc (CD) or DVD disc drive 1606 coupled to the processor 1601. The server 1600 may also include network access ports 1603 coupled to the multi-core processor assemblies 1601 for establishing network interface connections with a network 1605, such as a local area network coupled to other broadcast system computers and servers, the Internet, the public switched telephone network, and/or a cellular data network (e.g., CDMA, TDMA, GSM, PCS, 3G, 4G, LTE, or any other type of cellular data network).

Computer program code or "program code" for execution on a programmable processor for carrying out operations of the various aspects may be written in a high level programming language such as C, C++, C#, Smalltalk, Java, JavaScript, Visual Basic, a Structured Query Language (e.g., Transact-SQL), Perl, or in various other programming languages. Program code or programs stored on a computer readable storage medium as used in this application may refer to machine language code (such as object code) whose format is understandable by a processor.

Many computing devices operating system kernels are organized into a user space (where non-privileged code runs) and a kernel space (where privileged code runs). This separation is of particular importance in Android and other general public license (GPL) environments in which code that is part of the kernel space must be GPL licensed, while code running in the user-space may not be GPL licensed. It should be understood that the various software components/modules discussed here may be implemented in either the kernel space or the user space, unless expressly stated otherwise.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the various embodiments may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary embodiments, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for managing multiple memory devices as a single contiguous memory, comprising:
   determining a portion of a memory on a multi-slot communication device is associated with a portion of a removable memory as the single contiguous memory;
   attempting to access the single contiguous memory on the multi-slot communication device;
   determining that the removable memory is inaccessible on the multi-slot communication device;
   identifying a unique identifier of the removable memory;
   connecting to the removable memory connected to a wireless device via a wireless network by the multi-slot communication device; and
   accessing the memory and the removable memory as the single contiguous memory by the multi-slot communication device using the wireless network to access the removable memory by the multi-slot communication device.

2. The method of claim 1, further comprising translating a memory access request for a virtual memory address to at least one memory access request for a physical address of at least one of the memory on the multi-slot communication device and the removable memory on the wireless device.

3. The method of claim 2, wherein translating a memory access request for a virtual memory address to at least one memory access request for a physical address of at least one of the memory on the multi-slot communication device and the removable memory on the wireless device comprises translating the memory access request for the virtual memory address to a plurality of memory access requests for physical addresses of both the memory and the removable memory.

4. The method of claim 3, further comprising dividing a file or group of files of the memory access request for the virtual memory address among the plurality of memory access requests for the physical addresses of both the memory and the removable memory.

5. The method of claim 2, wherein accessing the memory and the removable memory as the single contiguous memory by the multi-slot communication device using the wireless network to access the removable memory by the multi-slot communication device comprises sending the memory access request for the physical address of the removable memory to the removable memory over the wireless network by the multi-slot communication device.

6. The method of claim 2, wherein translating a memory access request for a virtual memory address to at least one memory access request for a physical address of at least one of the memory on the multi-slot communication device and the removable memory on the wireless device is accomplished in a middle layer,
the method further comprising operating an application in an application layer using the virtual memory address as if the memory and the removable memory were a single contiguous memory within the multi-slot communication device.

7. The method of claim 1, wherein determining a portion of a memory on a multi-slot communication device is associated with a portion of a removable memory as the single contiguous memory comprises retrieving an entry of memory correlation data correlating a unique identifier of the memory and the unique identifier of the removable memory on the multi-slot communication device.

8. The method of claim 1, wherein:
the removable memory is a removable universal integrated circuit card (UICC) memory;
the wireless network is cellular network; and
connecting to the removable memory connected to a wireless device via a wireless network comprises connecting to the removable UICC memory connected to the wireless device via the cellular network using the unique identifier of the removable UICC memory by the multi-slot communication device.

9. The method of claim 8, wherein the UICC memory is a universal serial bus (USB) UICC memory.

10. The method of claim 1, wherein the memory is a universal serial bus (USB) memory.

11. The method of claim 1, wherein connecting to the removable memory connected to a wireless device via a wireless network by the multi-slot communication device comprises:
engaging in a handshake exchange of information; and
enabling a data connection to the removable memory.

12. The method of claim 11, wherein:
engaging in a handshake exchange of information comprises engaging in the handshake exchange of information via a first wireless network; and
enabling a data connection to the removable memory comprises enabling a data connection to the removable memory via a second wireless network.

13. The method of claim 12, wherein:
the first wireless network comprises a cellular network; and
enabling a data connection to the removable memory via a second wireless network comprises using one of a wireless local area network (WLAN) protocol, a Bluetooth data link, and a WiFi Direct data link.

14. The method of claim 1, further comprising:
receiving, from the wireless device, details of the portion of the removable memory offloaded by the wireless device to another memory;
updating a memory correlation table to reflect the details of the portion of the removable memory offloaded by the wireless device to the other memory; and
wherein accessing the memory and the removable memory as the single contiguous memory by the multi-slot communication device using the wireless network to access the removable memory by the multi-slot communication device comprises accessing the memory and the other memory containing the portion of the removable memory offloaded by the wireless device to the other memory as the single contiguous memory by the multi-slot communication device.

15. A multi-slot communication device, comprising:
a first memory device interface slot configured to electrically connect to a memory;
a second memory device interface slot configured to electrically connect to a removable memory;
a processor configured to execute a memory manager component and configured with processor-executable instructions to:
determine a portion of the memory on the multi-slot communication device is associated with a portion of the removable memory configured as a single contiguous memory;
attempt to access the single contiguous memory on the multi-slot communication device;
determine that the removable memory is inaccessible on the multi-slot communication device;
identify a unique identifier of the removable memory;
connect to the removable memory connected to a wireless device via a wireless network by the multi-slot communication device; and
access the memory and the removable memory as the single contiguous memory by the multi-slot communication device using the wireless network to access the removable memory by the multi-slot communication device.

16. The multi-slot communication device of claim 15, wherein the processor is further configured with processor-executable instructions to translate a memory access request for a virtual memory address to at least one memory access request for a physical address of at least one of the memory on the multi-slot communication device and the removable memory on the wireless device.

17. The multi-slot communication device of claim 16, wherein the processor is further configured with processor-executable instructions to translate a memory access request for a virtual memory address to at least one memory access request for a physical address of at least one of the memory on the multi-slot communication device and the removable memory on the wireless device by translating the memory access request for the virtual memory address to a plurality of memory access requests for physical addresses of both the memory and the removable memory.

18. The multi-slot communication device of claim 17, wherein the processor is further configured with processor-executable instructions to divide a file or group of files of the memory access request for the virtual memory address among the plurality of memory access requests for the physical addresses of both the memory and the removable memory.

19. The multi-slot communication device of claim 16, wherein the processor is further configured with processor-executable instructions to access the memory and the removable memory as a single contiguous memory by the multi-slot communication device using the wireless network to access the removable memory by the multi-slot communication device by sending the memory access request for the physical address of the removable memory to the removable memory over the wireless network by the multi-slot communication device.

20. The multi-slot communication device of claim 16, wherein the processor is further configured with processor-executable instructions to:
translate a memory access request for a virtual memory address to at least one memory access request for a physical address of at least one of the memory on the multi-slot communication device and the removable memory on the wireless device in a middle layer; and
operate an application in an application layer using the virtual memory address as if the memory and the removable memory were the single contiguous memory within the multi-slot communication device.

21. The multi-slot communication device of claim 15, wherein the processor is further configured with processor-executable instructions to determine a portion of the memory on the multi-slot communication device is associated with a portion of the removable memory as the single contiguous memory by retrieving an entry of memory correlation data correlating a unique identifier of the memory and the unique identifier of the removable memory on the multi-slot communication device.

22. The multi-slot communication device of claim 15, wherein:
the removable memory is a removable universal integrated circuit card (UICC) memory;
the wireless network is cellular network; and
the processor is further configured with processor-executable instructions to connect to the removable memory connected to a wireless device via a wireless network by connecting to the removable UICC memory connected to the wireless device via the cellular network using the unique identifier of the removable UICC memory by the multi-slot communication device.

23. The multi-slot communication device of claim 22, wherein the UICC memory is a universal serial bus (USB) UICC memory.

24. The multi-slot communication device of claim 15, wherein the memory is a universal serial bus (USB) memory.

25. The multi-slot communication device of claim 15, wherein the processor is further configured with processor-executable instructions to connect to the removable memory connected to a wireless device via a wireless network by the multi-slot communication device by:
engaging in a handshake exchange of information; and
enabling a data connection to the removable memory.

26. The multi-slot communication device of claim 25, wherein the processor is further configured with processor-executable instructions to:
engage in a handshake exchange of information by engaging in the handshake exchange of information via a first wireless network; and
enable a data connection to the removable memory by enabling the data connection to the removable memory via a second wireless network.

27. The multi-slot communication device of claim 26, wherein:
the first wireless network comprises a cellular network; and
the processor is further configured with processor-executable instructions to enable a data connection to the removable memory via a second wireless network by using one of a wireless local area network (WLAN) protocol, a Bluetooth data link, and a WiFi Direct data link.

28. The multi-slot communication device of claim 15, wherein the processor is further configured with processor-executable instructions to:
receive, from the wireless device, details of the portion of the removable memory offloaded by the wireless device to another memory;
update a memory correlation table to reflect the details of the portion of the removable memory offloaded by the wireless device to the other memory; and
access the memory and the removable memory as the single contiguous memory by the multi-slot communication device using the wireless network to access the removable memory by the multi-slot communication device by accessing the memory and the other memory containing the portion of the removable memory offloaded by the wireless device to the other memory as the single contiguous memory by the multi-slot communication device.

29. A multi-slot communication device, comprising:
means for electrically connecting to a memory;
means for electrically connecting to a removable memory
means for determining a portion of the memory on the multi-slot communication device is associated with a portion of the removable memory that is configured as a single contiguous memory;
means for attempting to access the single contiguous memory on the multi-slot communication device;
means for determining that the removable memory is inaccessible on the multi-slot communication device;
means for identifying a unique identifier of the removable memory;
means for connecting to the removable memory connected to a wireless device via a wireless network by the multi-slot communication device; and
means for accessing the memory and the removable memory as the single contiguous memory by the multi-slot communication device using the wireless network to access the removable memory by the multi-slot communication device.

30. A non-transitory processor-readable medium having stored thereon processor-executable software instructions to cause a processor to perform operations comprising:
determining a portion of a memory on a multi-slot communication device is associated with a portion of a removable memory configured as a single contiguous memory;
attempting to access the single contiguous memory on the multi-slot communication device;
determining that the removable memory is inaccessible on the multi-slot communication device;
identifying a unique identifier of the removable memory;
connecting to the removable memory connected to a wireless device via a wireless network by the multi-slot communication device; and accessing the memory and the removable memory as the single contiguous memory by the multi-slot communication device using the wireless network to access the removable memory by the multi-slot communication device.

* * * * *